| (12) | United States Patent | (10) Patent No.: US 12,184,649 B2 |
|---|---|---|
| | Wang et al. | (45) Date of Patent: Dec. 31, 2024 |

(54) IDENTITY AUTHENTICATION METHOD, PERSONAL SECURITY KERNEL NODE, DEVICE, AND MEDIUM

(71) Applicant: Tencent Technology (Shenzhen) Company Limited, Shenzhen (CN)

(72) Inventors: Dongyan Wang, Shenzhen (CN); Maocai Li, Shenzhen (CN); Bo Li, Shenzhen (CN); Haitao Tu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 766 days.

(21) Appl. No.: 17/147,370

(22) Filed: Jan. 12, 2021

(65) Prior Publication Data

US 2021/0136073 A1 May 6, 2021

Related U.S. Application Data

(63) Continuation of application No. PCT/CN2020/071952, filed on Jan. 14, 2020.

(30) Foreign Application Priority Data

Jan. 16, 2019 (CN) .......................... 201910041041.8

(51) Int. Cl.
  *H04L 29/00* (2006.01)
  *G06F 21/31* (2013.01)
  (Continued)

(52) U.S. Cl.
  CPC .......... *H04L 63/0884* (2013.01); *G06F 21/31* (2013.01); *H04L 9/3247* (2013.01); *H04L 9/50* (2022.05)

(58) Field of Classification Search
  CPC ..... H04L 63/0884; H04L 9/3247; H04L 9/50; G06F 21/31
  (Continued)

(56) References Cited

U.S. PATENT DOCUMENTS 9,805,213 B1 * 10/2017 Kragh ................... G06F 16/245
2010/0313032 A1 12/2010 Oswalt
(Continued)

FOREIGN PATENT DOCUMENTS

CN 102811210 A 12/2012
CN 107832632 A 3/2018
(Continued)

OTHER PUBLICATIONS

Tencent Technology, ISR, PCT/CN2020/071952, Apr. 16, 2020, 2 pgs.
Tencent Technology, WO, PCT/CN2020/071952, Apr. 16, 2020, 5 pgs.
Tencent Technology, IPRP, PCT/CN2020/071952, Jun. 16, 2021, 6 pgs.

*Primary Examiner* — Brandon Hoffman
*Assistant Examiner* — Michael D Anderson
(74) *Attorney, Agent, or Firm* — Morgan, Lewis & Bockius LLP

(57) ABSTRACT

The present disclosure provides an identity authentication method, a personal security kernel node, a device, and a medium. The personal security kernel node is part of an identity authentication system, the identity authentication system further comprising a relying party node and a user identity credential certifier node. The method includes: obtaining an identity authentication assurance level corresponding to a service provided by a relying party; determining, according to the identity authentication assurance level, a user identity credential used by a user for the service; transmitting the user identity credential to a user identity credential certifier node through a relying party node, so that the user identity credential certifier node performs user (Continued)

identity credential authentication; and performing the service with the relying party node. According to the embodiments of the present disclosure, security of user identity assets can be improved during identity authentication.

17 Claims, 16 Drawing Sheets

(51) Int. Cl.
*H04L 9/32* (2006.01)
*H04L 9/40* (2022.01)
*H04L 9/00* (2022.01)

(58) Field of Classification Search
USPC .................................................. 726/7
See application file for complete search history.

(56) References Cited

U.S. PATENT DOCUMENTS

| | | | |
|---|---|---|---|
| 2011/0239306 A1* | 9/2011 | Avni | G06F 21/62 |
| | | | 726/26 |
| 2015/0332029 A1 | 11/2015 | Coxe et al. | |
| 2017/0054707 A1* | 2/2017 | Leicher | H04L 63/06 |

FOREIGN PATENT DOCUMENTS

| | | |
|---|---|---|
| CN | 108932418 A | 12/2018 |
| CN | 109150541 A | 1/2019 |
| CN | 110245472 A | 9/2019 |
| JP | 2006502456 A | 1/2006 |
| WO | WO 2003038577 A2 | 5/2003 |

* cited by examiner

Signature

XX audit

| | |
|---|---|
| Detection item | Physical security |
| Detection organization | XX center |
| Associated assets | XX machine room |
| Company liaison | Xx |
| Auditor | XxA |

*lily*

FIG. 2M

Signature

XX audit

| | |
|---|---|
| Detection item | Physical security |
| Detection organization | XX center |
| Associated assets | XX machine room |
| Company liaison | Xx |
| Auditor | XxA |

*lily*

Modify the signature

FIG. 2N

Personal center

Safe box      Setting

Basic information

Credential bag

Address association

Resume

FIG. 2O

IDENTITY AUTHENTICATION METHOD, PERSONAL SECURITY KERNEL NODE, DEVICE, AND MEDIUM

CROSS REFERENCE TO RELATED APPLICATIONS

This application is a continuation application of PCT Patent Application No. PCT/CN2020/071952, entitled "IDENTITY AUTHENTICATION METHOD, PERSONAL SECURITY KERNEL NODE, DEVICE AND MEDIUM" filed on Jan. 14, 2020, which claims priority to Chinese Patent Application No. 201910041041.8, filed with the State Intellectual Property Office of the People's Republic of China on Jan. 16, 2019, and entitled "IDENTITY AUTHENTICATION METHOD, PERSONAL SECURITY KERNEL NODE, AND MEDIUM", all of which are incorporated herein by reference in their entirety.

FIELD OF THE TECHNOLOGY

The present disclosure relates to the field of identity authentication, and in particular, to an identity authentication technology.

BACKGROUND OF THE DISCLOSURE

Identity is one of basic frameworks of human society. In production and life of the human society, service development needs to be premised on identity authentication with a specific assurance level. In the related art, the identity authentication is generally performed based on a mode in which a specific centralized authority issues and manages identity information. However, with the development of various service types, personal identities are becoming multi-dimensional. The disadvantages of a conventional identity authentication mode are increasingly prominent. For example, information stored in a centralized manner is often easily obtained or sold maliciously.

In addition, identity information is often excessively collected. For example, despite that a user only intends to handle express delivery or take a taxi, ID card information of the user is collected. However, infrastructure investments and capabilities of such express delivery and taxi operating companies on data protection may not be enough to protect the identity information of the user. Once data leakage occurs, a vicious cycle of information leakage is exacerbated. Leakage of legal identity information on which identity verification may rely originally is particularly serious, and the identity verification is exposed to increasingly high risks. This not only affects services and reputation of the collection authorities, and more seriously, directly puts identity assets of the user at risk.

SUMMARY

The present disclosure provides an identity authentication method, a personal security kernel node, a device, and a medium, to improve security of user identity assets during identity authentication.

According to an aspect of the embodiments of the present disclosure, an identity authentication method is disclosed. The identity authentication method is performed by a computer device acting as a personal security kernel node of an identity authentication system. The identity authentication system includes the personal security kernel node, and further includes a relying party node and a user identity credential certifier node. The method includes:

obtaining an identity authentication assurance level corresponding to a service provided by a relying party;

determining, according to the identity authentication assurance level, a user identity credential used by a user for the service;

transmitting the user identity credential to the user identity credential certifier node through the relying party node, wherein the user identity credential certifier node performs user identity credential authentication; and performing the service with the relying party node in response to reception of a receipt indicating that the user identity credential authentication succeeds from the user identity credential certifier node.

According to an aspect of the embodiments of the present disclosure, a personal security kernel node is disclosed. The personal security kernel node exists in an identity authentication system. The identity authentication system includes the personal security kernel node, and further includes a relying party node and a user identity credential certifier node. The personal security kernel node includes:

an identity authentication assurance level obtaining module, configured to obtain an identity authentication assurance level corresponding to a service provided by a relying party;

a user identity credential determining module, configured to determine, according to the identity authentication assurance level, a user identity credential used by a user for the service;

a user identity credential transmission module, configured to transmit the user identity credential to the user identity credential certifier node through the relying party node, so that the user identity credential certifier node performs user identity credential authentication; and a first service performance module, configured to perform the service with the relying party node in response to reception of a receipt indicating that the user identity credential authentication succeeds from the user identity credential certifier node.

According to an aspect of the embodiments of the present disclosure, a device is disclosed, including: a memory, storing computer-readable instructions; and a processor, reading the computer-readable instructions stored in the memory, to perform the method according to any one of the above.

According to an aspect of the embodiments of the present disclosure, a computer program medium is disclosed, storing computer-readable instructions, the computer-readable instructions, when executed by a processor of a computer, causing the computer to perform the method according to any one of the above.

According to an aspect of the embodiments of the present disclosure, a computer program product is disclosed, including instructions, the instructions, when being run on a computer, causing the computer to perform any method described above.

The identity authentication method provided in the embodiments of the present disclosure does not provide every user identity credential that the relying party intends to collect; instead, the user identity credential provided for the relying party only just reaches the identity authentication assurance level required by the service provided by the relying party. It is not necessary to provide excessive user identity credentials that may result in unnecessary identity information leakage. Therefore, the identity authentication assurance level corresponding to the service provided by the relying party is obtained, and the user identity credential used by the user for the service is determined according to the identity authentication assurance level, so that the user identity credential is transmitted to the user identity credential certifier node through the relying party node, and the user identity credential certifier node performs user identity credential authentication. In this way, it is ensured that the user identity credential provided for the relying party is just adapted to the service provided by the relying party, and no excessive identity information is provided, to avoid leakage, thereby improving the security of the user identity assets during identity authentication.

Other features and advantages of the present disclosure become obvious through the following detailed descriptions, or partly learned through practice of the present disclosure.

The above general descriptions and the following detailed descriptions are merely exemplary, and cannot limit the present disclosure.

BRIEF DESCRIPTION OF THE DRAWINGS

To describe the technical solutions in the embodiments of this application or in the related art more clearly, the following briefly describes the accompanying drawings required for describing the embodiments or the related art. Apparently, the accompanying drawings in the following descriptions show merely the embodiments of this application, and a person of ordinary skill in the art may still derive other drawings from the accompanying drawings without creative efforts.

FIG. 1A is a simplified system architecture diagram, and FIG. 1B is a more detailed system architecture diagram based on FIG. 1A.

DESCRIPTION OF EMBODIMENTS

Figure 1A:
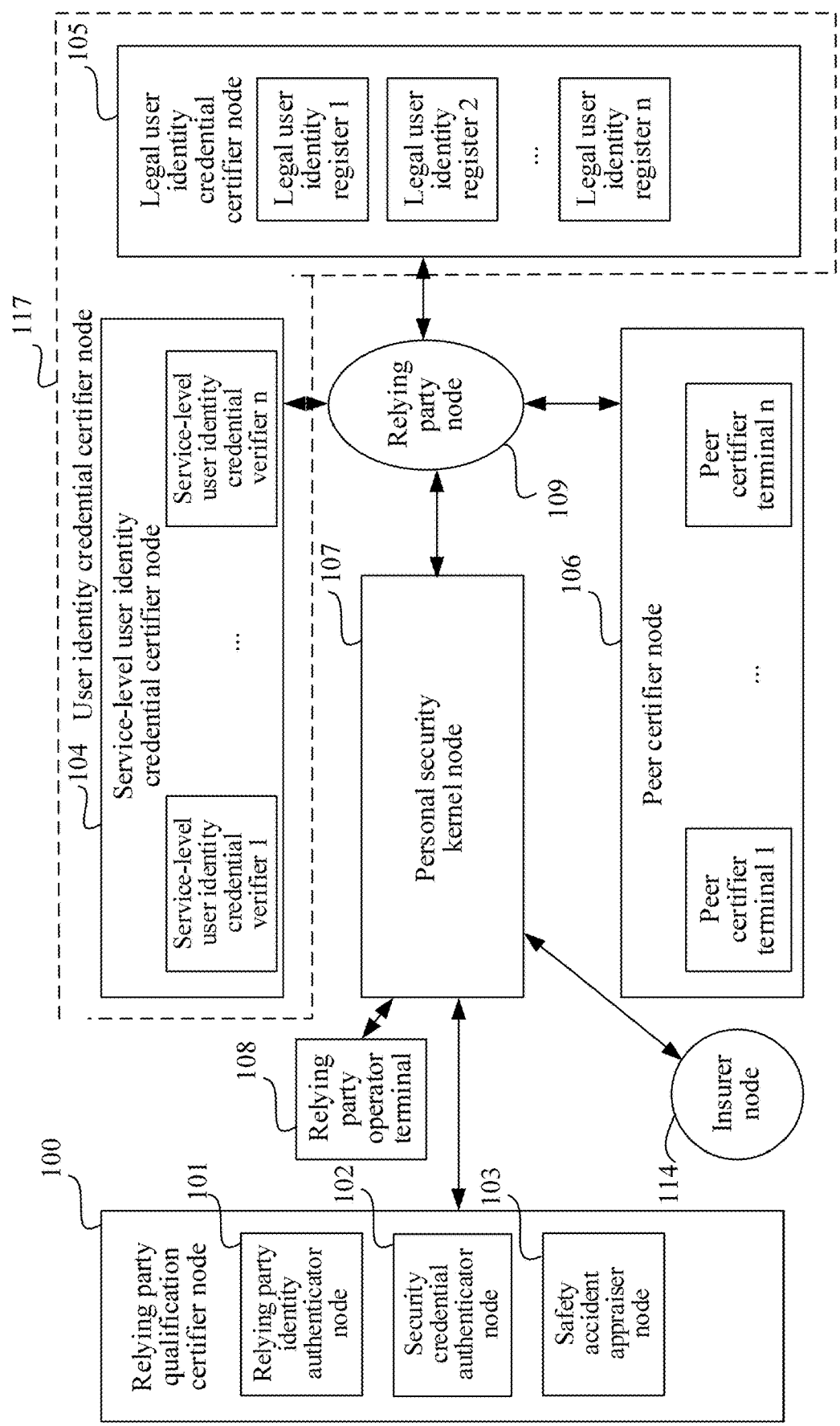
FIG. 1A and FIG. 1B are system architecture diagrams of an identity authentication system to which an identity authentication method is applied according to an embodiment of the present disclosure, where

At present, exemplary implementations are described more comprehensively with reference to the accompanying drawings. However, the exemplary implementations may be implemented in various forms, and are not understood as being limited to the examples described herein. Conversely, the exemplary implementations are provided to make the descriptions of the present disclosure more comprehensive and complete, and completely convey the idea of the exemplary implementations to a person skilled in the art. The accompanying drawings are merely exemplary illustrations of the present disclosure and are not necessarily drawn to scale. The same reference numbers in the drawings represent the same or similar parts, and therefore, repeated descriptions thereof are omitted.

In addition, the described features, structures, or characteristics may be combined in one or more exemplary implementations in any appropriate manner. In the following descriptions, a lot of specific details are provided to give a comprehensive understanding of the exemplary implementations of the present disclosure. However, a person skilled in the art is to be aware that, the technical solutions in the present disclosure may be practiced while one or more of the specified details may be omitted, or another method, element, step, and the like may be used. In other cases, well-known structures, methods, implementations, or operations are not shown or described in detail, so as to avoid distraction and obscuring the aspects of the present disclosure.

Some of the block diagrams shown in the accompanying drawings are functional entities and do not necessarily correspond to physically or logically independent entities. Such functional entities may be implemented in the form of software, or implemented in one or more hardware modules or integrated circuits, or implemented in different networks and/or processor apparatuses and/or micro-controller apparatuses.

A system architecture to which the embodiments of the present disclosure are applied is first described below with reference to FIG. 1A and FIG. 1B.

As shown in FIG. 1A, the identity authentication system includes a personal security kernel node 107, a relying party node 109, a relying party qualification certifier node 100, a user identity credential certifier node 117, a peer certifier node 106, a relying party operator terminal 108, and an insurer node 114. The user identity credential certifier node 117 includes a legal user identity credential certifier node 105 and a service-level user identity credential certifier node 104.

The personal security kernel node 107 is a security core of a personal identity. Each user has a corresponding personal security kernel node 107. The personal security kernel node is a core node that manages user personal identity information, and implements, according to the user identity information, the identity authentication method according to the embodiments of the present disclosure. As shown in FIG. 1B, the personal security kernel node may include a personal security kernel node client 115 and a personal security kernel node server 116. The personal security kernel node client 115 is a client that is installed on a user terminal, and is configured to implement, according to the user identity information, the identity authentication method according to the embodiments of the present disclosure. The personal security kernel node server 116 is a server that cooperates with the personal security kernel node client 115 to perform the identity authentication method according to the embodiments of the present disclosure.

Figure 1B:
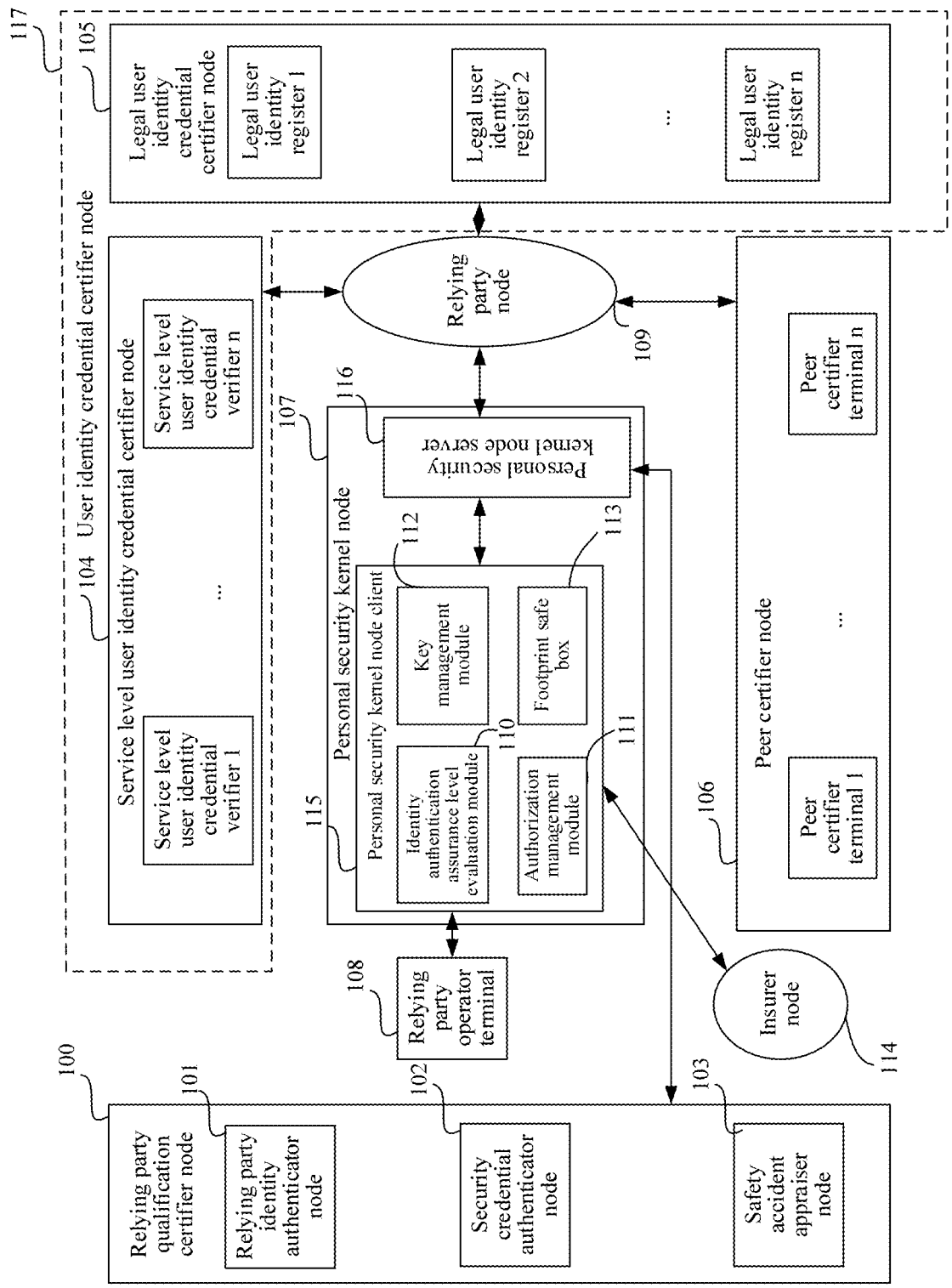

As shown in FIG. 1B, the personal security kernel node client 115 includes an identity authentication assurance level evaluation module 110, a key management module 112, an authorization management module 111, and a footprint safe box 113.

The identity authentication assurance level evaluation module 110 is a module that determines a used identity authentication assurance level according to requirements of a service. The module may store a correspondence table of services and identity authentication assurance levels. The identity authentication assurance level adapted to the service may be determined with reference to the correspondence table. The identity authentication assurance level required for the service may alternatively be obtained directly from the external (for example, the relying party operator terminal 108).

The authorization management module 111 is a module that enables a user to complete authorization of a user identity credential, and is configured to perform user identity credential authentication. The authorization management module may provide, through matching, candidate user identity credentials corresponding to the identity authentication assurance level for the user according to the identity authentication assurance level, for the user to authorize, receive a candidate user identity credential authorized by the user, and transmit the authorized user identity credential for authentication.

The key management module 112 stores a key of the personal security kernel node. Because one user corresponds to one personal security kernel node, the key management module 112 actually stores a user-specific key (a private key generally). The private key is very important for each step of the identity authentication method according to the embodiments of the present disclosure. In the identity authentication method according to the embodiments of the present disclosure, when a service performance result is delivered after the service is performed with the relying party, the service performance result needs to be signed with the private key of the user. It can be considered that the service performance result is made by the user only after the relying party node successfully verifies the signature by using a public key of the user, and then the service performance result is saved. In addition, during authentication, relying party qualification information, the user identity credential authorized by the user, and the like transmitted by the personal security kernel node 107 are all transmitted after being signed with the private key of the user. After the transmission, the other party verifies the signature by using the public key of the user, to prove that the relying party qualification information, the user identity credential authorized by the user, and the like are indeed transmitted by the personal security kernel node 107, and then subsequent operations may be performed, because the key is a necessary tool to ensure authenticity of various information transmitted in the whole identity authentication process. The key is a basis for the reliability of various user identity assets.

The footprint safe box 113 is a specific area, in the personal security kernel node 107, for storing the identity authentication credential of the user and a receipt of user identity credential authentication. Generally, due to limited capacity, the footprint safe box 113 generally stores a digest of the receipt of the user identity credential authentication. After the user identity credential authentication, the relying party node 109 stores an authentication receipt for the user identity credential. Therefore, when the receipt is required, the corresponding receipt may be requested from the relying party node 109 by virtue of the stored digest of the receipt.

The relying party node 109 refers to a node of a party on which the performance of the service of the user relies, and generally refers to a server node of the party that is relied on. For example, in an express delivery service, the user relies on an express delivery company to complete the express delivery service, and a server of the express delivery company is the relying party node 109 in the express delivery service. In an auditing service, the user relies on an auditing company to complete the auditing service, and a server of the auditing company is the relying party node 109 in the auditing service.

The relying party operator terminal 108 refers to a terminal used by a service performing operator when the relying party and the user perform a specific service. For example, in the express delivery service, a terminal used by a courier who specifically communicates with the user to perform the express delivery service is the relying party operator terminal 108. In the auditing service, a terminal used by an auditor is the relying party operator terminal 108.

The insurer node 114 is a server terminal of an insurance company. An identity authentication application or a signature applet according to the embodiments of the present disclosure is put into use after being developed, and may be insured by the insurance company. Once information leakage occurs when the user uses the identity authentication application or the signature applet, if the user is not responsible for the information leakage, the insurance company pays for the loss caused by the leakage. Therefore, in the embodiments of the present disclosure, some events that occur in the interaction process may be related to insurance claims, and the insurer node 114 needs to be notified.

The legal user identity credential certifier node 105 is a node with which a user legal identity is registered. Because the legal identity is registered with the node, it is most suitable for the node to authenticate the legal user identity credential. Therefore, the node with which the legal identities are registered serves as a node for authenticating the identities. There are a large quantity of authorities that provide identity registration globally, and for individuals and units, registration authorities are different. Therefore, the node is a collection of various legal corporate identity registration units, and includes a plurality of legal user identity registers 1-n. Each legal user identity register is a registration authority, and is also an authentication authority. For example, for an identity card, a corresponding legal user identity register is a public security bureau; for a driving license, a corresponding legal user identity register is a traffic management bureau; and for a business license, a corresponding legal user identity register is an industrial and commercial bureau.

The service-level user identity credential is a credential provided by some service providers with higher data security protection capability and universal service capability in the industry to prove the user identity. The service-level user identity credential has lower effectiveness than the legal identity credential, and is often registered based on the original legal identity credential. The service-level user identity credential has the advantage of proving the user identity without exposing the legal identity credential. For example, after registration with a specific media platform, a user owns an account in the media platform. The user may use an original credential such as an identity card during registration, and the media platform has relatively high data security protection capability and universal service capability. Therefore, when a requirement on the identity authentication assurance level is not high, the account in the media platform may be provided as a user identity credential to achieve a specific proof function, although the proof function of the account number is weaker than that of the legal identity credential, such as the identity card. The service provider helps implement the service-level identity credential of the user according to a service registration behavior of the user. This is important in an inclusive identity verification service, and is an indispensable part of social infrastructure.

The peer certifier node 106 may include a terminal of an individual certifier associated with identity authentication. When a requirement on the identity authentication assurance level is not high, no user identity credential may be required; only terminal identifiers of a few certifiers are provided, and then messages are transmitted to the terminals of the certifiers for confirmation. In this way, whether the user identity is legal can also be proved in some cases where requirements on the identity are less restrict. Currently, such cases commonly include filling in a resume and retrieving an account.

The relying party qualification certifier node 100 refers to a terminal that authenticates whether the relying party has a permission to require the user to provide the user identity credential. A check on the permission of the relying party generally includes: checking whether the identity of the relying party is legal, checking whether the relying party has enough capability to protect the user identity assets from leakage, checking whether the relying party has a historical user identity asset leakage event, and the like. Correspondingly, the relying party qualification information includes a relying party identity certificate, a relying party security credential, a relying party security record, and the like.

The relying party identity certificate is a proof of the relying party identity issued by an authority with which the relying party identity is registered. A terminal (a server generally) of an authority that issues the relying party identity certificate is the relying party identity authenticator node 101. For example, the express delivery company is registered with the industrial and commercial bureau, and the business license issued by the industrial and commercial bureau is the relying party identity certificate. A server of the industrial and commercial bureau is the relying party identity authenticator node 101.

The relying party security credential is a proof of the security level of the relying party, which is made by an authority that examines the relying party's capability of protecting the security of the user identity assets. For example, four security levels may be defined. The relying parties may be divided into four levels according to their capability of protecting the data security, and certificates of different levels are issued. Authorities that issue the relying party security credentials are generally neutral security auditing authorities, for example, security standards committees, and security investigation authorities. A terminal (a server generally) of the authority issuing the relying party security credential is the security credential authenticator node 102.

The security accident appraiser node 103 is a node specifically for appraising and registering security accidents. The security accident appraisal organization supervises security events of each unit. When a major security event occurs, the security accident appraisal organization identifies whether the security event is a security accident according to a predetermined standard, and stores the security accident as a security record. Afterwards, once any security event occurs, the related security event is compared with the security accident appraiser node 103, to verify whether the security event is a security accident that has occurred before. Therefore, the security accident appraiser may serve as an authenticator of the security records. A terminal of the security accident appraiser is the security accident appraiser node.

Interface diagrams of an application scenario in which an identity authentication method according to an embodiment of the present disclosure is applied to a specific application scenario such as auditing result verification are described below with reference to FIG. 2A to FIG. 2O. The interface is an interface of a specialized identity authentication application (APP) or a signature applet application that is developed according to the embodiments of the present disclosure.

Figures 2A, 2B, 2C, 2D:
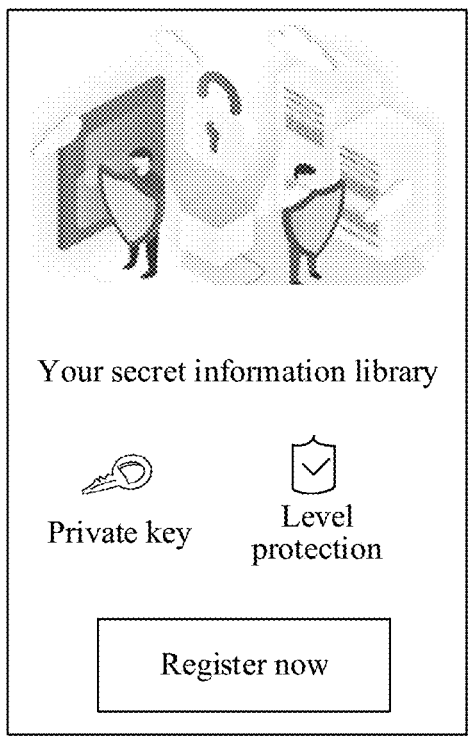
FIG. 2A to FIG. 2O are scenario interface diagrams of an application scenario in which an identity authentication method according to an embodiment of the present disclosure is applied to a signature applet for auditing result delivery.

FIG. 2A shows an interface for user key initialization of an identity authentication APP or a signature applet application according to the embodiments of the present disclosure. As described above, the transmission of various information in the authentication process of the identity authentication method according to the embodiments of the present disclosure all relates to identity information, while the transmission of the identity information requires a signature of a transmitter of the information, to prove that the identity information is transmitted by the signer and is true and reliable. To make a signature, a pair of public and private keys for signature needs to be generated first. If the user selects "private key" on the interface in FIG. 2A, an interface shown in FIG. 2B appears.

The interface shown in FIG. 2B requires the user to enter a mobile phone number and a verification code.

After the user enters the mobile phone number and the verification code, and selects "confirm", an interface shown in FIG. 2C appears, to start to generate a pair of public and private keys for the user.

After the pair of public and private keys is generated, an interface shown in FIG. 2D is displayed, which shows that "The safe box is under first-level protection". The safe box, that is, the footprint safe box in FIG. 1B, not only stores the user identity credential, but also stores a receipt, received from the relying party node, of a user identity credential authentication result. Security of all such information needs to be protected with the keys. After the keys are generated, the safe box obtains the first-level protection.

Figure 2E:
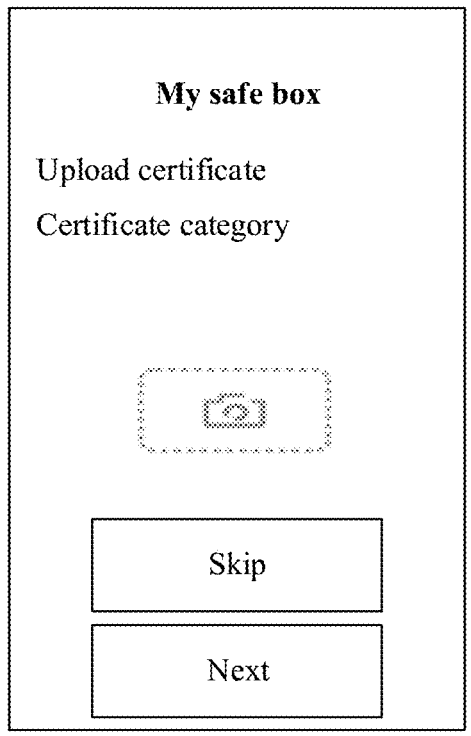

If the user wants to obtain higher-level protection, the user selects "continue to enhance" in FIG. 2D, and an interface in FIG. 2E appears, which requires the user to upload a certificate, for example, an identity card.

Figure 2F:
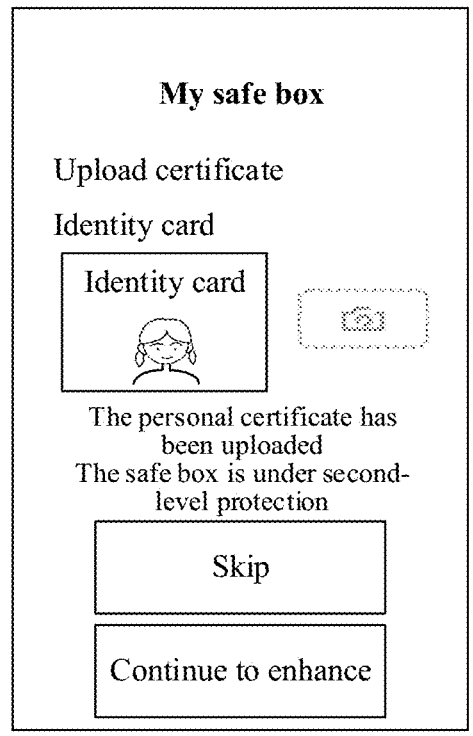

After the user finishes uploading the certificate, an interface in FIG. 2F is displayed, showing that "The personal certificate has been uploaded, and the safe box is under second-level protection". In this case, the generated keys may be changed according to the uploaded personal certificate. Combined with the uploaded certificate information, the keys become more complex and more difficult to crack. Therefore, the safe box obtains the second-level protection.

Figure 2G:
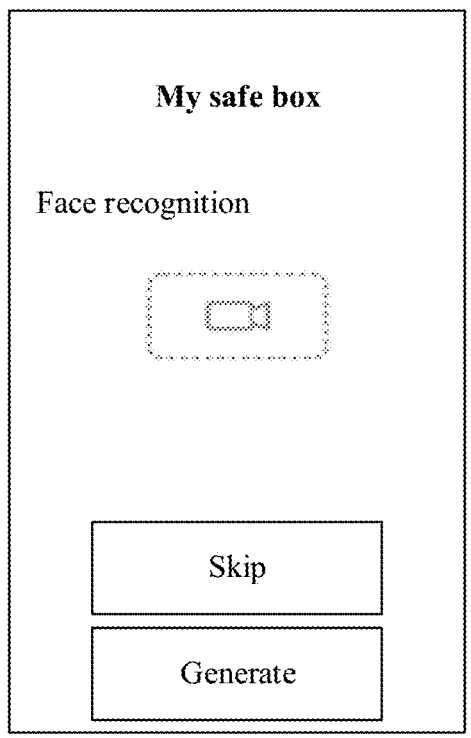

If the user still wants to obtain higher-level protection, the user selects "continue to enhance" on the interface in FIG. 2F, to enter an interface in FIG. 2G, which requires the user to perform facial recognition.

Figure 2H:
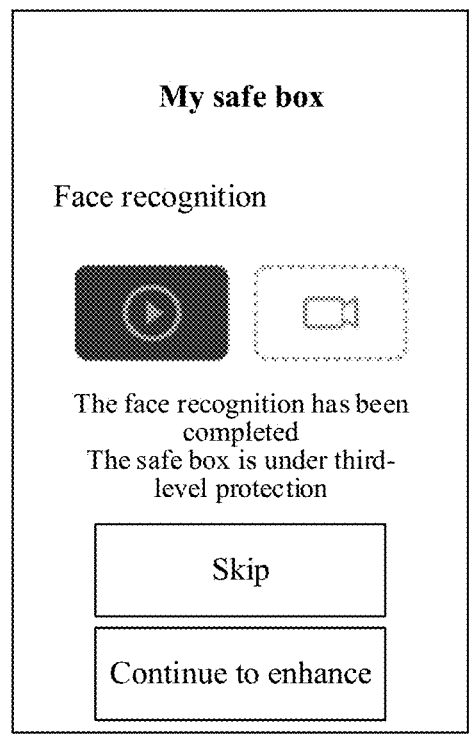

After a photo of the face of the user is taken, an interface in FIG. 2H is entered, showing that "The face recognition has been completed, and the safe box is under third-level protection". In this case, the generated keys may be further changed according to the uploaded face. In combination with the uploaded face information, the keys become more complex and more difficult to crack. Therefore, the safe box obtains the third-level protection.

Figure 2I:
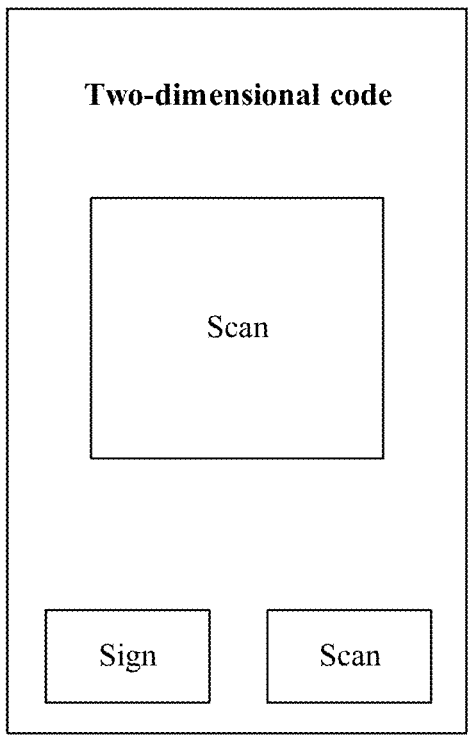

Starting from an interface in FIG. 2I, interfaces of the identity authentication APP or the signature applet application according to the embodiments of the present disclosure in formal use are shown.

Using verification of an auditing result as an example, an auditing party completes the auditing result for an audited party, and the auditing result is reviewed and signed by the audited party. In this case, as shown in FIG. 2I, liaison of the audited party scans, with a mobile phone, a two-dimensional code generated after an auditor of the auditing party finishes an audit. The two-dimensional code includes qualification information of the auditing party, a link of the auditing result of the auditing party, and the like.

After the two-dimensional code is scanned, the verification and signature process of the auditing result is not performed immediately. First, the qualification of the auditing party is authenticated. The auditing party needs to check a user identity credential of the audited party in the auditing result verification, and it is also unsafe to give the identity credential of the audited party to the auditing party for check. The auditing party needs to be trustworthy. Therefore, it is necessary to first verify whether the auditing party has the suitable qualification and has the capability to ensure the security of the identity credential of the audited party. Therefore, after being scanned from the two-dimensional code, the qualification information of the relying party is first transmitted to the relying party identity authenticator node 101, the security credential authenticator node 102, and the security accident appraiser node 103 in FIG. 1A to authenticate the qualification of the relying party. After the qualification authentication of the auditing party succeeds, not all user identity credentials can be provided to the auditing party. The auditing service corresponds to an identity authentication assurance level, for example, level 2. Only user identity credentials that match the level are provided to the auditing party, and it is unnecessary to provide excessive user identity credentials, to avoid identity asset leakage.

Figure 2J:
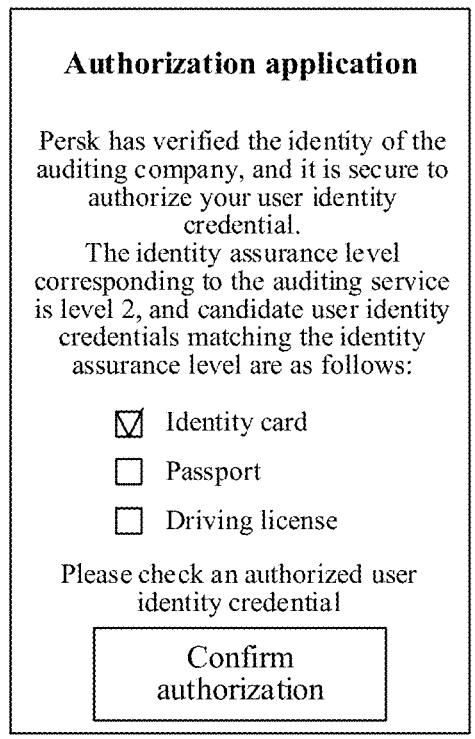

Because it is determined that the user identity credentials corresponding to the auditing service include an identity card, a passport, a driving licenses, and the like, on an interface in FIG. 2J, the liaison of the audited party is required to check a credential authorized to be used. For example, the liaison may select the identity card as the authorized user identity credential.

In this case, the auditing party verifies the identity of the audited party according to the authorized user identity credential of the audited party. Because the identity card is a legal certificate, the identity card is transmitted to the legal user identity credential certifier node 105 for authentication. After the legal user identity credential certifier node 105 performs authentication, an authentication result is transmitted back to the auditing party. If the authentication succeeds, an interface in FIG. 2K is displayed, and verification and signature may be performed by using the auditing result.

Figure 2K:
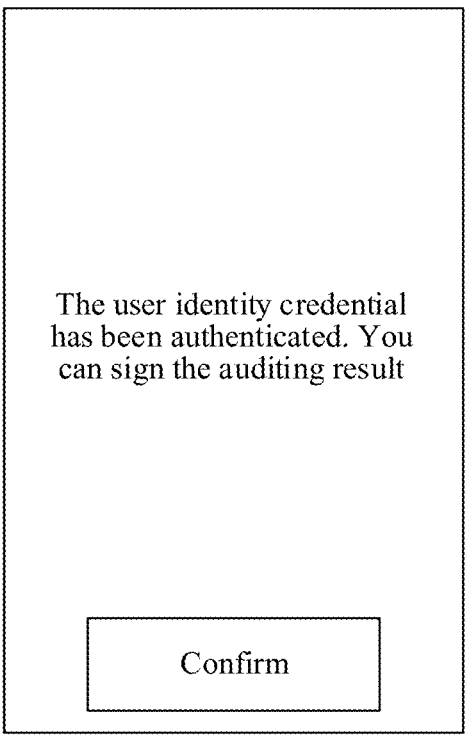
Figure 2L:
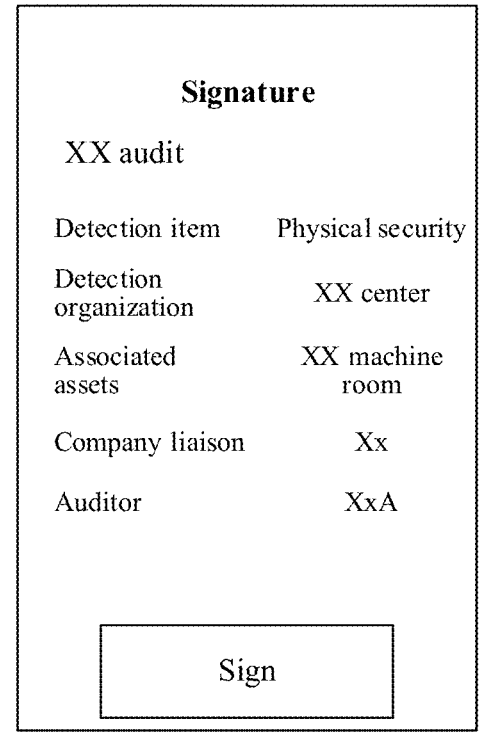

The liaison selects "confirm" on the interface in FIG. 2K, and a verification result of the auditing result shown in FIG. 2L is displayed. If the liaison considers that the auditing result is correct, the liaison selects "sign", and the auditing result is signed with a private key generated in FIG. 2A to FIG. 2H.

Because Chinese people are more accustomed to making a real signature, on an interface in FIG. 2M, the user is asked to handwrite a signature on the screen.

After handwriting the signature, the user is allowed to modify the signature on an interface in FIG. 2N. After the signature is modified, the user makes a confirmation, and the signed auditing result is transmitted to the auditing party.

After the signature confirmation, an interface, that is, a home page of a personal center, shown in FIG. 2O appears. The user may view and modify basic information such as a mobile phone number, a Wechat number, and a mail address on the home page. The user may also view and modify a credential package, such as an identity card, a driving license, and a passport on the home page.

Figure 3:
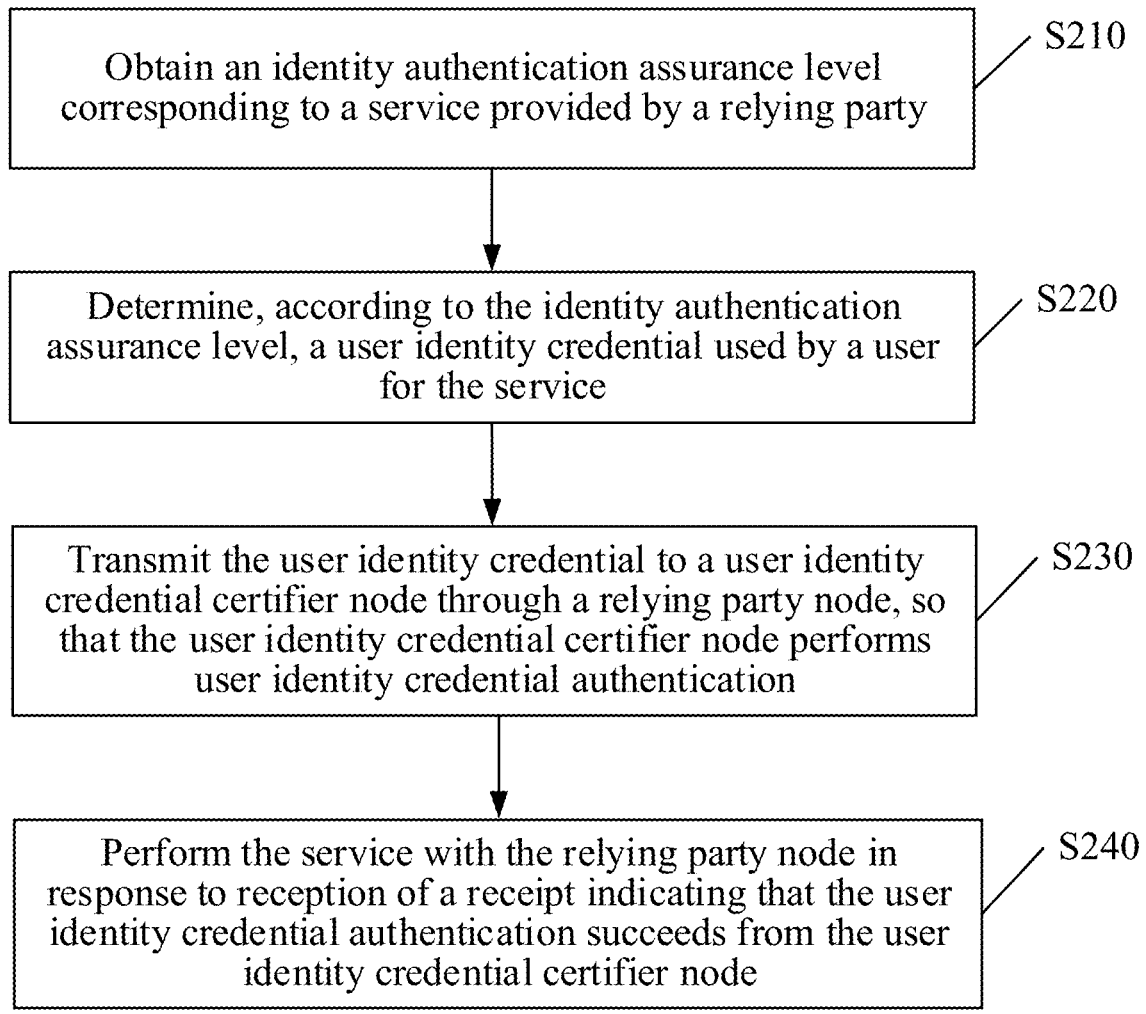
FIG. 3 is a flowchart of an identity authentication method according to an embodiment of the present disclosure.

As shown in FIG. 3, an identity authentication method is provided according to an embodiment of the present disclosure. The identity authentication method refers to a method for verifying an identity of a user and determining whether the identity of the user is legal. The identity authentication method is often prepared for performance of a specific service. The service herein refers to a service provided by a specialized authority, such as express delivery or auditing. The service can be performed for the user only after the identity of the user is verified to be legal. For example, the express delivery company needs to verify an identity certificate of the user, and then provides the express delivery service for the user. Conventional identity authentication is generally performed in such a manner that liaison of a party providing the service (relying party) views a certificate of liaison of a served party (service demander). The service demander is generally not allowed to view a certificate of the relying party. Even if the service demander requests to view the certificate of the relying party, the request is generally rejected. As a result, when providing the identity credential, the service demander has doubt about whether the identity credential is leaked. In addition, the service demander usually has to provide any identity credential required by the relying party. Therefore, the service demander often provides excessive identity information, and once the information is leaked, the service demander will suffer from loss. In the mechanism according to the embodiments of the present disclosure, the qualification of the relying party is automatically checked first, and the service demander is required to provide the user identity credential only when the qualification authentication of the relying party succeeds. In addition, the user identity credential only needs to adapt to the service provided by the relying party, thus avoiding risks caused by provision of excessive identity information.

The identity authentication method is performed by the personal security kernel node of the identity authentication system. As shown in FIG. 3, the method includes the following steps:

Step 210. Obtain an identity authentication assurance level corresponding to a service provided by a relying party.

Step 220. Determine, according to the identity authentication assurance level, a user identity credential used by a user for the service.

Step 230. Transmit the user identity credential to a user identity credential certifier node through a relying party node, so that the user identity credential certifier node performs user identity credential authentication.

Step 240. Perform the service with the relying party node in response to reception of a receipt indicating that the user identity credential authentication succeeds from the user identity credential certifier node.

The following describes the foregoing steps in detail.

In step 210, an identity authentication assurance level corresponding to a service provided by a relying party is obtained.

In an embodiment, before the user identity authentication is performed in steps 210 to 240, it may be further verified whether the relying party, who performs the user identity authentication to carry out the service, has the qualification to authenticate the user identity. Therefore, the method further includes the following steps.

Step 250. Obtain relying party qualification information.

Step 260. Transmit the relying party qualification information to a relying party qualification certifier node, so that the relying party qualification certifier node performs relying party qualification authentication.

In this case, in step 210, the method for obtaining an identity authentication assurance level corresponding to a service provided by a relying party may include the following steps:

Step 270. Obtain, in response to receiving a reply indicating that the relying party qualification authentication succeeds from the relying party qualification certifier node, the identity authentication assurance level corresponding to the service provided by the relying party.

In this method, before the user identity authentication is performed, it is first verified whether the relying party, who performs the user identity authentication to carry out the service, has the qualification to authenticate the user identity. That is, the relying party qualification information is transmitted to the neutral relying party qualification certifier node, so that the relying party qualification certifier node performs relying party qualification authentication. In this way, unqualified relying parties are restricted from collecting user identity assets, thereby minimizing leakage of user identity assets.

In step 250, the relying party qualification information is obtained.

The relying party qualification information refers to information proving that the relying party is qualified to obtain the identity information of the service demander, and includes a relying party identity certificate, a relying party security credential, a relying party security record, and the like.

In an embodiment, the relying party qualification information may be obtained by scanning a two-dimensional code of liaison of the relying party by liaison of the service demander. The two-dimensional code includes the relying party qualification information. A terminal of the liaison of the service demander is installed with the identity authentication APP or the signature applet application according to the embodiments of the present disclosure, and is equivalent to a personal security kernel node. After the two-dimensional code is scanned, the relying party qualification information is obtained from the two-dimensional code. FIG. 2I is a schematic diagram of an interface in which the liaison of the service demander scans the two-dimensional code of the liaison of the relying party.

In another embodiment, the relying party qualification information may alternatively be obtained by scanning a two-dimensional code of the liaison of the service demander by the liaison of the relying party. The two-dimensional code of the liaison of the service demander includes a communication address of the terminal of the liaison of the service demander. After the two-dimensional code is scanned, the terminal of the liaison of the relying party obtains the communication address of the terminal of the liaison of the service demander from the two-dimensional code, and transmits the relying party qualification information according to the communication address.

Step 260. Transmit the relying party qualification information to a relying party qualification certifier node, so that the relying party qualification certifier node performs relying party qualification authentication.

In a case that the personal security kernel node includes a personal security kernel client and a personal security kernel server, the identity authentication method is performed by the personal security kernel client. In this case, the transmitting the relying party qualification information to a relying party qualification certifier node includes: transmitting the relying party qualification information to the relying party qualification certifier node through the personal security kernel server.

The relying party qualification information includes a relying party identity certificate, a relying party security credential, a relying party security record, and the like. Correspondingly, the authentication of the relying party qualification information includes relying party identity authentication, relying party security credential authentication, relying party security record authentication, and the like.

For the relying party identity authentication, there may be many different relying party identity authenticator nodes. For example, for enterprises, different local industrial and commercial bureaus are authorities for registration, and therefore, a server of each local industrial and commercial bureau is the relying party identity authenticator node. For government and public institutions, a superior national administration is an authority for registration, and therefore, the superior national administration is the relying party identity authenticator node. To enable the personal security kernel server to identify a relying party identity authenticator node that performs the relying party identity authentication, the relying party qualification information includes a relying party identity certificate, and may further include an identifier of a relying party identity authenticator node that issues the relying party identity certificate. In this way, step 260 may include: transmitting the relying party identity certificate to the relying party identity authenticator node corresponding to the relying party identity authenticator node identifier, to perform relying party identity authentication.

The relying party identity authenticator node is a terminal that issues the relying party identity certificate for the relying party, and stores a copy of the issued certificate. Therefore, the relying party identity certificate is compared with the stored copy, and if the relying party identity certificate is consistent with the stored copy, the authentication succeeds; otherwise, the authentication fails.

The relying party identity authentication may prove that the identity of the relying party is true, so that the service demander can trust the relying party and provide the identity credential required for service performance to the relying party.

For the authentication of the relying party security credential, there may be many different security credential authenticator nodes. For example, the security credential authenticator node may be the ministry of state security, a specialized information security committee, or the like. To enable the personal security kernel server to identify a security credential authenticator node that performs the security credential authentication, the relying party qualification information includes a relying party security credential, and may further include an identifier of a security credential authenticator node that issues the relying party security credential. In this way, step 260 may include: transmitting the relying party security credential to the security credential authenticator node corresponding to the security credential authenticator node identifier, to perform relying party security credential authentication.

The security credential authenticator node is a terminal that issues the security credential for the relying party, and stores a copy of the issued security credential. Therefore, the relying party security credential is compared with the stored copy, and if the relying party security credential is consistent with the stored copy, the authentication succeeds; otherwise, the authentication fails.

The relying party security authentication has the advantage of ensuring the relying party to have sufficient capability to protect the user identity assets, so that the service demander trusts the relying party and is willing to provide the identity credential for verification.

For the authentication of the relying party security record, because the security record is not issued by any authority, the security record may be transmitted to a specialized security accident appraiser node for verification. The security accident appraiser node may be a server of a security accident appraisal committee, or the like. The security accident appraisal committee collects information of each security accident. It may be specified that, after a security accident occurs, the security accident needs to be reported to the security accident committee. To avoid that a security accident occurs but is not reported, the security accident committee also collects security information from the Internet. When there is a major security event, which may be used as a security accident, the security event is often reported by the media. Therefore, the security accident committee may alternatively obtain a security record of a security accident from the report on the Internet. In this way, the security accident appraiser node stores security records of historical security accidents of all relying parties. Step 260 may include: transmitting the security record to the security accident appraiser node, so that the security accident appraiser node compares the received security record with the stored security record of the security accident of the relying party, to obtain an authentication result of the security record. When the received security record is consistent with the security record of the security accident of the relying party, the security record authentication succeeds; otherwise, the authentication fails. In addition, to prevent that the security accident appraiser node stores an incomplete security record of security accidents, when the received security record includes more security accidents than the stored security record of security accidents of the relying party, verification may be performed with parties related to the excessive security record. If the security record is verified to be true, it is also considered that the security record authentication succeeds. However, generally, if the received security record of the relying party includes fewer security accidents than the stored security record of security accidents of the relying party, the authentication fails.

The security record authentication ensures that the security record of the relying party is true, so that the service demander believes that the relying party does not leak the identity asset information provided by the service demander; therefore, the service demander provides the required identity credential to the relying party.

The relying party security credential authentication and the relying party security record authentication only ensure that the security credential and the security record of the relying party are true. It may be further determined whether the relying party is reliable enough and qualified to be provided with the identity credential. In an embodiment, after step 260, the method further includes:

determining whether a security level in the relying party security credential reaches a security level threshold corresponding to the service provided by the relying party node.

A correspondence table of services and security level thresholds may be provided in the personal security kernel node. The correspondence table may be searched to determine whether the security level in the relying party security credential reaches the security level threshold corresponding to the service provided by the relying party node. If the security level in the relying party security credential is greater than or equal to the security level threshold corresponding to the service provided by the relying party node, a subsequent procedure may be further performed; otherwise, the service is stopped.

Whether the relying party security credential is appropriate is determined according to the foregoing embodiments. It is ensured that, subsequent authentication can be performed only when the relying party security credential meets predetermined requirements.

In addition to determining the qualification of the relying party security credential, the qualification of the security record may be further determined. In an embodiment, after step 260, the method further includes:

transmitting, in a case that the security record of the relying party does not match a security credential level of the relying party according to a security credential level and security record matching rule, a notification of degrading the security credential level of the relying party to the security credential authenticator node.

The security credential level and the security record matching rule is set in the personal security kernel node client. Whether the security record of the relying party matches the security credential level of the relying party may be determined according to the rule. For example, the rule requires that, if the security record includes a record of one major security accident or a record of three medium security accidents, the security credential level cannot be rated as level 3 or higher. If there is a record of two medium security accidents in the security record of the relying party, the security credential level may be rated as level 3 or higher.

In this embodiment, in a case that the security record of the relying party does not match the security credential level of the relying party, only the notification of degrading the security credential level of the relying party is transmitted to the security credential authenticator node, instead of determining to stop performing the service. Finally, whether the service can be performed depends on whether the degraded security level in the relying party security credential reaches the security level threshold corresponding to the service provided by the relying party node, which is determined in the foregoing step. This embodiment has the advantage of taking both the impact of the security record on the reliability of the relying party and the historical security level of the relying party into consideration, thereby improving objectivity of the qualification audit of the relying party.

In step 270, the identity authentication assurance level corresponding to the service provided by the relying party is obtained in response to reception of the reply indicating that the relying party qualification authentication succeeds from the relying party qualification certifier node.

In a case that the personal security kernel node includes the personal security kernel client and the personal security kernel server, step 210 includes: receiving, through the personal security kernel server, the reply indicating that the relying party qualification authentication succeeds from the relying party qualification certifier node.

In a case that the qualification of the relying party security credential and the relying party security record is examined, step 210 includes: obtaining, if a reply indicating that the relying party qualification authentication succeeds is received from the relying party qualification certifier node and the security level in the relying party security credential reaches a security level threshold corresponding to the service provided by the relying party node, the identity authentication assurance level corresponding to the service provided by the relying party. This embodiment has the advantage of not only considering the authenticity of the relying party security credential and the relying party security record, but also considering whether the relying party reaches a reliability degree actually required by the service, so that the service demander trusts the relying party more.

In an embodiment, the obtaining an identity authentication assurance level corresponding to a service provided by a relying party includes: obtaining, from a scanned two-dimensional code of the relying party, the identity authentication assurance level corresponding to the service provided by the relying party. That is, the two-dimensional code shown in FIG. 2I not only includes the relying party qualification information, but also includes the identity authentication assurance level corresponding to the service provided by the relying party. Therefore, the identity authentication assurance level may be obtained by scanning the code. This embodiment achieves the advantage of being simple and direct.

In an embodiment, the relying party qualification information includes the service of the relying party. The obtaining an identity authentication assurance level corresponding to a service provided by a relying party includes: searching a correspondence table of services and identity authentication assurance levels, to determine the identity authentication assurance level corresponding to the service provided by the relying party.

That is, the personal security kernel node client stores a correspondence table of services and identity authentication assurance levels. The relying party qualification information scanned from the two-dimensional code shown in FIG. 2I further includes the service of the relying party, such as audit or express delivery. The correspondence table of services and identity authentication assurance levels is searched according to the service of the relying party, to determine the identity authentication assurance level corresponding to the service. The advantage of this embodiment lies in that, the identity authentication assurance level is not determined by the relying party, so that the identity authentication assurance level is determined based on a more objective standard, thereby improving the objectivity of the identity authentication.

In step 220, the user identity credential used by the user for the service is determined according to the identity authentication assurance level.

The user identity credential is a package file formed by combining a user identity certificate and user information required in the service. Certainly, when the service does not require other user information, the user identity credential may be a user identity certificate alone, such as an identity card. The user information required in the service is, for example, a user address, a postal code, and the like. When the service is performed, other user information is often required in addition to the user identity certificate. Therefore, it is often necessary to package the user identity certificate and other user information required in the service into a file, which is used as a credential, and the file is a combination of various information. During authentication, the file is authenticated as a whole.

In an embodiment, the user identity credential in step 220 may be authorized by the user. Therefore, in step 220, the method of determining, according to the identity authentication assurance level, a user identity credential used by a user for the service may include:
presenting candidate user identity credentials that match the identity authentication assurance level and the service provided by the relying party; and
receiving a candidate user identity credential selected by the user, and determining the candidate user identity credential selected by the user as the user identity credential used by the user for the service.

The candidate user identity credentials in the foregoing steps are alternative user identity credentials waiting to be authorized by the user.

In addition, the candidate user identity credential selected by the user may alternatively be used as an authorized user identity credential used by the user for the service.

In an embodiment, step 220 includes: searching the correspondence table of identity authentication assurance levels, services, and user identity credentials, to determine user identity credentials that match the identity authentication assurance level and the service provided by the relying party, and presenting the determined user identity credentials as candidate user identity credentials. Therefore, the candidate user identity credential selected by the user is received, and the candidate user identity credential selected by the user is determined as the user identity credential used by the user for the service.

The candidate user identity credentials are recommended for the user according to the identity authentication assurance level and the service provided by the relying party, to help the user select a user identity credential from the candidate user identity credentials for authorization.

During determining of the candidate user identity credentials, the candidate user identity credentials not only need to match the identity authentication assurance level, but also need to match the service, even the identity credentials are of the same type, different services may be interested in different identity credentials. For example, the driving license and the identity card are identity credentials of the same identity authentication assurance level, but in the auditing service, it is more likely to authenticate the identity card rather than the driving license. The advantage of this embodiment lies in that, the user identity credentials that match the identity authentication assurance level and the service provided by the relying party are determined through table lookup, so that the provision of the candidate user identity credentials is objective, thereby improving the authentication effect.

For the following steps, the candidate user identity credential selected by the user is received, and the candidate user identity credential selected by the user is determined as the user identity credential used by the user for the service.

As shown in FIG. 2J, the user may select the candidate user identity credential in a manner of, for example, checking in a check box. The selected credential is the authorized user identity credential. The authorization is managed by the authorization management module 111 in FIG. 1B.

In step 230, the user identity credential is transmitted to the user identity credential certifier node through the relying party node, to perform the user identity credential authentication.

In a case that the personal security kernel node includes the personal security kernel client and the personal security kernel server, the transmitting the user identity credential to the user identity credential certifier node through the relying party node includes: transmitting the user identity credential to the user identity credential certifier node through the personal security kernel server and the relying party node.

Because the user identity credential authorized by the user may be a legal user identity credential (a legal user certificate+other user information required for the service), or a service-level user identity credential (a service-level user certificate+other user information required for the service), nodes that authenticate the legal user identity credential and the service-level user identity credential are different. As shown in FIG. 1B, the legal user identity credential and the service-level user identity credential are authenticated by the legal user identity credential certifier node 105 and the service-level user identity credential certifier node 104 respectively. Therefore, in an embodiment, the transmitting the user identity credential to the user identity credential certifier node through the relying party node includes: transmitting the user identity credential to the relying party node, and transmitting the user identity credential to the legal user identity credential certifier node by the relying party node in a case that the user identity credential is a legal identity credential; and transmitting the user identity credential to the service-level user identity credential certifier node by the relying party node in a case that the user identity credential is a service-level user identity credential.

Because the legal user identity credential certifier node is a node with which the legal user identity is registered, and stores an original legal user identity credential, the received legal user identity credential may be compared with the stored original legal user identity credential to complete legal user identity authentication. Because the service-level user identity credential certifier node is a node with which the service-level identity is registered, and stores an original service-level user identity credential, the received service-level user identity credential may be compared with the stored original service-level user identity credential to complete service-level user identity authentication. This embodiment has the advantage of using different authentication manners according to different user identity credential types, thereby improving the authentication flexibility.

In step 240, the service is performed with the relying party node if the receipt indicating that the user identity credential authentication succeeds is received from the user identity credential certifier node.

In a case that the personal security kernel node includes the personal security kernel client and the personal security kernel server, the receiving a receipt indicating that the user identity credential authentication succeeds from the user identity credential certifier node includes: receiving, through the personal security kernel server, the receipt indicating that the user identity credential authentication succeeds from the user identity credential certifier node. The performance of the service, such as signing of an express delivery contract or verification of the auditing result, has different performance manners depending on different services.

Figure 4:
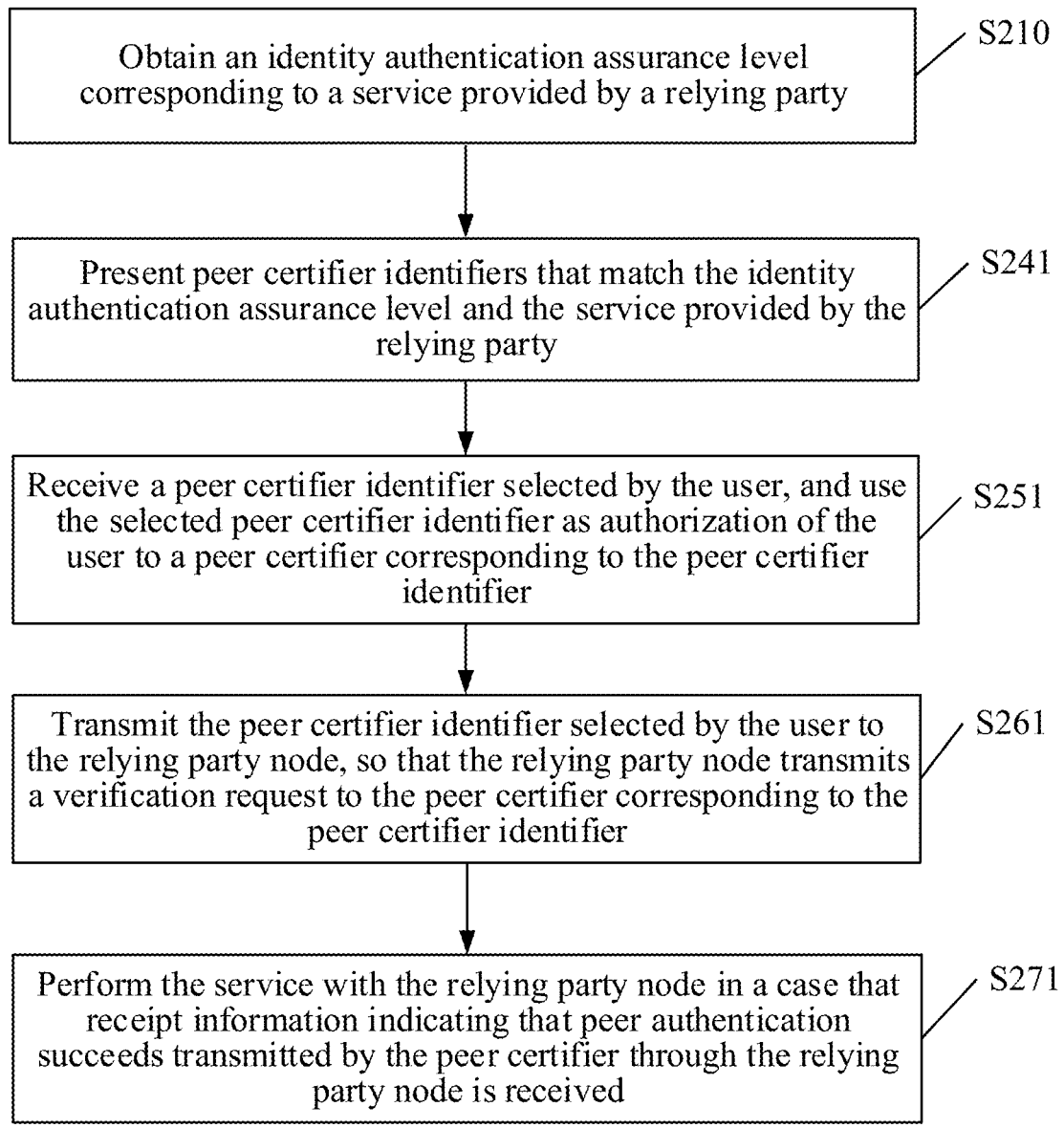
FIG. 4 is a flowchart of an identity authentication method according to an embodiment of the present disclosure.

As shown in FIG. 4, in an embodiment, after step 210, the method further includes the following steps:

Step 241. Present peer certifier identifiers that match the identity authentication assurance level and the service provided by the relying party.

Step 251. Receive a peer certifier identifier selected by the user, and use the selected peer certifier identifier as authorization of the user to a peer certifier corresponding to the peer certifier identifier.

Step 261. Transmit the peer certifier identifier selected by the user to the relying party node, so that the relying party node transmits a verification request to the peer certifier corresponding to the peer certifier identifier.

Step 271. Perform the service with the relying party node in a case that receipt information indicating that peer authentication succeeds transmitted by the peer certifier through the relying party node is received.

The peer certifier is a third party that is basically equivalent to the identity of the service demander. The peer certifier often works in a situation where the identity authentication assurance level is relatively low. For example, if the service demander is an ordinary individual, a third party who is equivalent to the identity of the ordinary individual may be a friend or a relative. When a requirement for the identity authentication assurance level is not high, to ensure the security of the identity credential, the service demander may not provide the user identity credential, but only provides several third parties that the service demander knows. During identity authentication, verification requests are transmitted to terminals of the third parties. If all the third parties can reply to prove the identity of the service demander, or a predetermined quantity of third parties reply to prove the identity of the service demander, it is considered that the service demander passes the authentication.

Certifiers have different proof functions. For example, if a principal of a school A serves as the peer certifier to prove the user identity, it may be more convincing than a student of the school A. Therefore, in an embodiment, all users in a user address book may be obtained, identity authentication assurance levels are assigned to the users according to identities in user attributes in the address book, and in combination with services provided by relying parties, a correspondence table of the identity authentication assurance levels, the services provided by relying parties, and the peer certifier identifiers is generated in advance. After the identity authentication assurance level is determined, peer certifier identifiers that match the identity authentication assurance level and the service provided by the relying party are obtained from the correspondence table, and presented to liaison of the service demander. The liaison selects a predetermined quantity (according to an interface prompt) of peer certifier identifiers as authorized peer certifier identifiers. Then, the peer certifier identifier selected by the user is transmitted to the relying party node, so that the relying party node transmits a verification request to a peer certifier corresponding to the peer certifier identifier. The peer certifier replies, where the reply includes a confirmation of the user identity.

If all peer certifiers of the user transmit replies including the confirmation of the user identity, or a predetermined quantity or predetermined proportion of replies including the confirmation of the user identity are received, it may be considered that the peer authentication succeeds. The relying party node transmits the receipt indicating that the peer authentication succeeds to the personal security kernel node, where the receipt includes a link of performing the service. After receiving the receipt, the personal security kernel node enters the link. In this case, the service may be performed with the relying party node. In an application scenario of verifying an auditing result, verification of a signature begins.

This embodiment has the advantage of preventing leakage of user identity credentials in cases where identity authentication assurance levels are relatively low.

In an embodiment, before step 210, the method further includes:

Step 200. Generate a pair of public and private keys of the user for the user in response to received user information, store the private key, and issue the public key.

FIG. 2A to FIG. 2H show a procedure of generating the pair of public and private keys of the user. The pair of public and private keys plays an important role in the security of the user identity assets in the footprint safe box. Both the relying party qualification transmitted in step 260 and the user identity credential transmitted in step 230 need to be signed with the generated private key, and the other party needs to perform verification by using the generated public key, to prove that the information is transmitted by the personal security kernel node of the user, thereby ensuring a legal source of each piece of information in the authentication process. Therefore, the pair of public and private keys guarantees the security of the user identity assets.

The user information not only includes the user identity information, but also includes other information. For example, in FIG. 2C, the user information includes the mobile phone number of the user. The pair of public and private keys can be generated according to the mobile phone number. In FIG. 2E, the user information further includes a user certificate. A more complex pair of public and private keys may be regenerated according to the user certificate and the mobile phone number. In FIG. 2G, the user information further includes biological information of the user, for example, face information. A more complex pair of public and private keys may be regenerated according to the biological information, the user certificate, and the mobile phone number. An advantage of generating the pair of public and private keys by using the biological information of the user is that it is difficult to crack the information signed or encrypted with the private key because it is difficult to copy the biological information and other users cannot obtain the biological information of the user, thereby improving the security.

The public key may be issued in a broadcast manner, that is, the public key is broadcast to all nodes, and all the nodes obtain the public key of the user from memory after storing the public key, to facilitate verifying the signature by using the public key in a subsequent process.

The public key may alternatively be issued in a manner of issuing to a dedicated key management center (not shown). After another party receives the signature of the message made by the user with the private key, the other party may obtain the public key of the user from the key management center to verify the signature.

Figure 5:
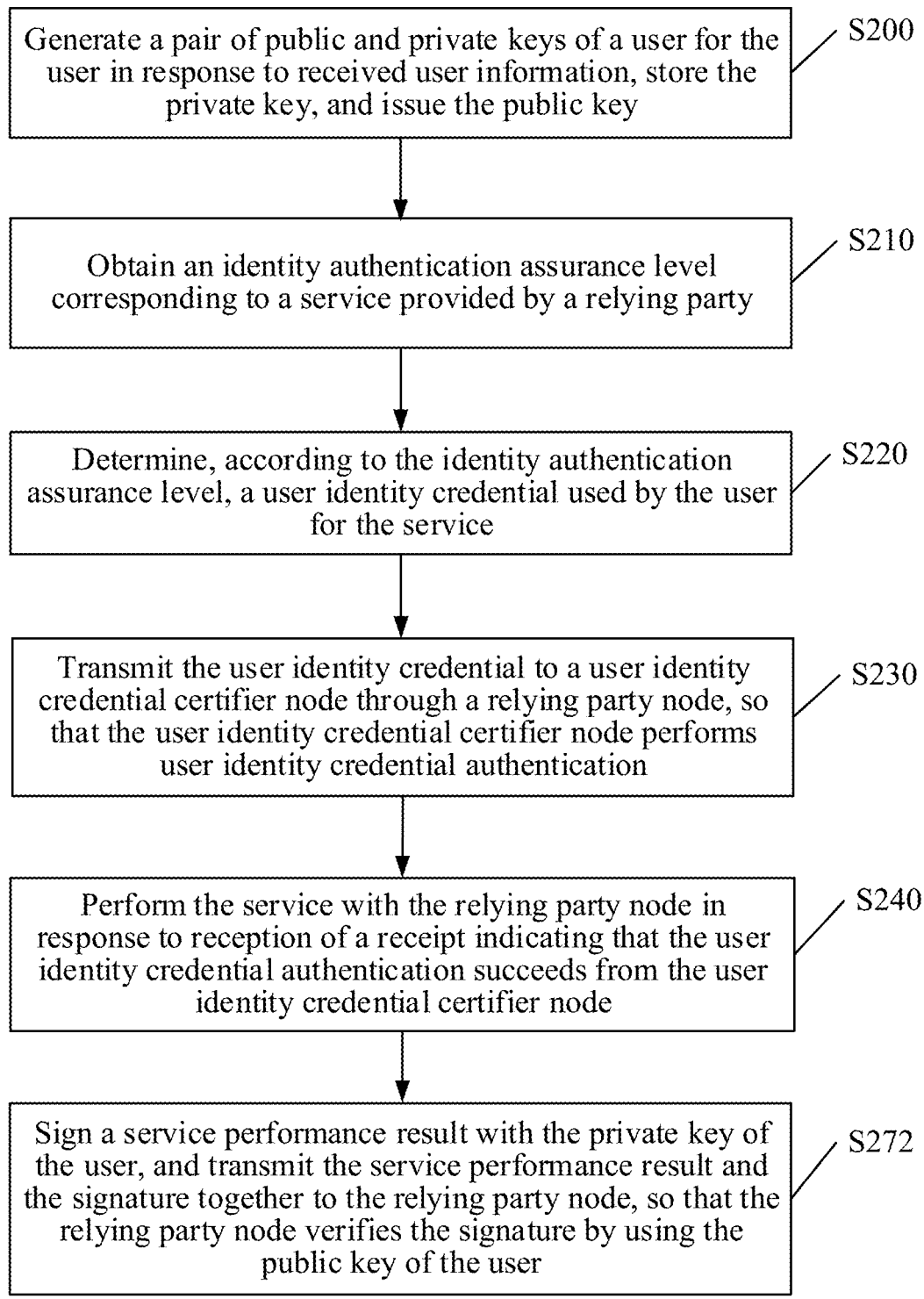
FIG. 5 is a flowchart of an identity authentication method according to an embodiment of the present disclosure.

In this embodiment, as shown in FIG. 5, after step 240, the method further includes:

Step 272. Sign a service performance result with the private key of the user, and transmit the service performance result and the signature together to the relying party node, so that the relying party node verifies the signature by using the public key of the user.

In the example of audit, the service performance result is, for example, an auditing result shown in FIG. 2L. When the terminal of the liaison of the audited party obtains the auditing result, the auditing result has been signed by the auditor of the auditing party, but still needs to be verified and then signed by the liaison of the audited party. After selecting "sign", the liaison signs with the private key generated in FIG. 2A to FIG. 2H, and the signature is transmitted to the relying party node. The relying party node obtains the public key of the user from the memory of the relying party node or the key management center to verify the signature.

The advantage in this embodiment is that, because the service performance result is signed with the private key of the user, only the user owns the private key of the user, thereby improving the authenticity of the message source in the authentication process.

In an embodiment, step 260 includes: transmitting the relying party qualification information together with a signature made on the relying party qualification information with the private key of the user to the relying party qualification certifier node, so that after the relying party qualification certifier node verifies the signature by using the public key of the user successfully, the relying party qualification certifier node performs relying party qualification authentication.

That is, when the relying party qualification information is transmitted, the relying party qualification information may be signed with the private key of the user, and the relying party qualification information and the signature are transmitted together. In this way, the relying party qualification certifier node that receives the relying party qualification information and the signature may verify the signature by using the public key of the user, to ensure that the relying party qualification information is actually transmitted by the personal security kernel node of the user.

In an embodiment, step 230 includes:
transmitting the user identity credential together with a signature made on the user identity credential with the private key of the user to the user identity credential certifier node through the relying party node, so that after successfully verifying the signature by using the public key of the user, the user identity credential certifier node performs user identity credential authentication.

That is, when the user identity credential is transmitted, the user identity credential may be signed with the private key of the user, and the user identity credential and the signature are transmitted together. In this way, the relying party node that receives the user identity credential and the signature of the user may verify the signature by using the public key of the user, to ensure that the user identity credential of the user is actually transmitted by the personal security kernel node of the user.

Figure 6:
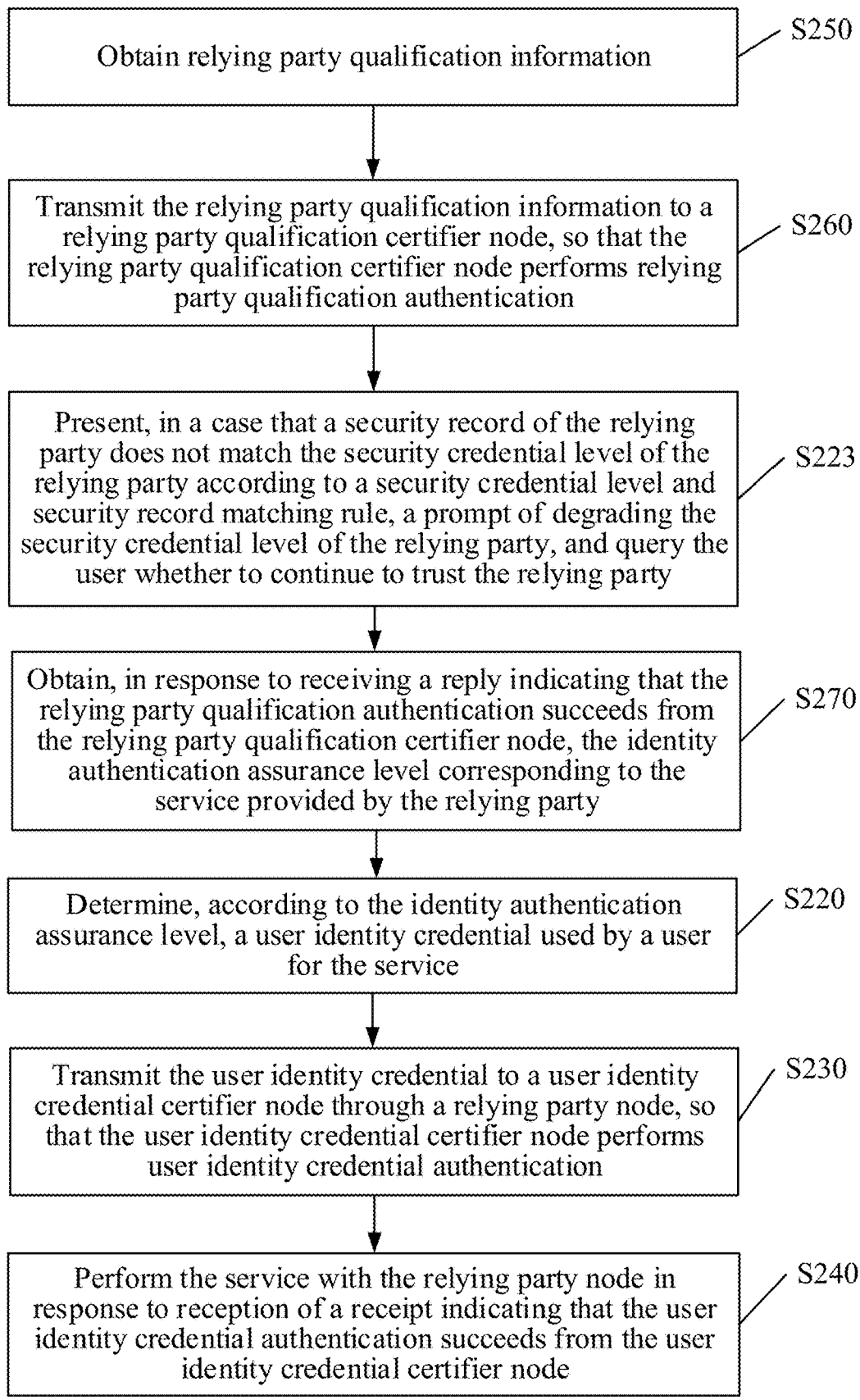
FIG. 6 is a flowchart of an identity authentication method according to an embodiment of the present disclosure.

In an embodiment, as shown in FIG. 6, after step 260, the method further includes:

Step 223. Present, in a case that the security record of the relying party does not match the security credential level of the relying party according to a security credential level and security record matching rule, a prompt of degrading the security credential level of the relying party, and query the user whether to continue to trust the relying party.

As mentioned in the foregoing embodiments, the security credential authenticator node needs to be notified in a case that the security record of the relying party does not match the security credential level of the relying party according to the security credential level and security record matching rule, to degrade the security credential level of the relying party. For the current user identity authentication, whether the subsequent authentication process may be continuously performed completely depends on whether the security credential level after degradation can reach the predetermined security credential level threshold. However, actually, another option may be provided for the user. That is, a prompt of degrading the security credential level of the relying party is presented to the user in a case that the security record of the relying party does not match the security credential level of the relying party, and the user is queried whether to continue to trust the relying party. If the user insists on trusting the relying party, the authentication process may be continued even if the downgraded security credential level does not reach the predetermined security credential level threshold. However, the risk of doing this is that the assurance level corresponding to the user identity credential of the user is also reduced. As the user selects to authorize a user identity credential to a relying party having a defective security record, if the relying party leaks information, it means that the user identity credential may be leaked. After the user identity credential is illegally obtained by others, the proving ability of the user identity credential is weakened. Therefore, the user may continue to trust the relying party, but needs to take the risk of the user identity credential being degraded.

In this embodiment, after step 230, the method further includes: degrading, in the correspondence table, the identity authentication assurance level corresponding to the user identity credential.

This embodiment achieves the advantage of allowing the user to make a choice, thus improving the flexibility of authentication using the user identity credential by the use, while making the user accountable for unsafe authorization, to ensure that the overall performance of the security authentication chain is not reduced.

As mentioned in the foregoing embodiments, the user reconsiders a security credential level of the relying party during security record authentication, and if the security record no longer supports the current security credential level of the relying party, the security credential level needs to be degraded. However, this is only the case for the relying party. Actually, there is another case. That is, the user identity credential of the user stored in the footprint safe box has been authorized to another relying party before, and is leaked with a security leakage event of the another relying party. The proof function of the user identity credential has been decreased. However, in the embodiment of the signature, only the security credential level and security record of the relying party in the current service are considered, while the problem that the proof function of the current user identity credential of the user has been decreased with the leakage of the third-party relying party is not considered. To resolve the problem, for the user identity credential selected by the user from the presented candidate user identity credentials that match the identity authentication assurance level and the service provided by the relying party in the foregoing step, it may be considered whether the selected user identity credential has been leaked in a security accident of another third-party relying party. If the user identity credential has been leaked, the user is advised to replace the identity credential. This embodiment has the advantage of detecting, in time, leakage of the current user identity credential of the user by the third-party relying party, so as to take appropriate measures, thereby improving the accuracy of the identity authentication.

Specifically, in this embodiment, the step of presenting candidate user identity credentials that match the identity authentication assurance level and the service provided by the relying party includes:
  determining a digest of the user identity credential selected by the user;
  determining whether the digest exists in an identity leakage verification blockchain, where in a case that the relying party has a security accident, the security accident and a digest of a user identity credential leaked in the security accident are recorded in the identity leakage verification blockchain;
  displaying a user identity credential replacement prompt in response to determining that the digest exists in the identity leakage verification blockchain; and
  using a user identity credential after replacement by the user as the user identity credential used by the user for the service.

This embodiment is based on the premise that any security incident of the relying party and any digest leaked in the security accident are all recorded in the identity leakage verification blockchain. In this way, according to the digest of the user identity credential selected by the user, it can be clearly determined whether the user identity credential is a user identity credential that has been leaked in the security accident. The reason why the user identity credential is not stored in the blockchain is to avoid causing a wider range of leakage. After the user selects the user identity credential, the digest of the user identity credential is first determined according to a predetermined digest algorithm (for example, a hash algorithm), and then the digest is compared with a block body of each data block in the identity leakage verification blockchain. If the user identity credential exists in a block body of a data block, the user is prompted to replace the authorized user identity credential.

In this embodiment, in a case that the user selects not to replace the user identity credential, after step 240, the method further includes: degrading, in the correspondence table of identity authentication assurance levels, services, and user identity credentials, the identity authentication assurance level corresponding to the user identity credential.

After it is confirmed that the user identity credential of the user has been leaked in a security accident, the user is not directly rejected from using the user identity credential, but is provided with an option. If the user has an important service that needs to be performed or is to be performed before a deadline, and the user temporarily cannot obtain a better user identity credential that is of the same identity authentication assurance level and that meets the requirement, the user may authorize the user identity credential, at the cost of degrading the user identity credential after use, because the user identity credential is authorized to a relying party that is less secure. This embodiment has the advantage of providing the user with selection flexibility while keeping the identity authentication chain green and healthy.

In an embodiment, in a case that the user selects not to replace the user identity credential, after step 240, the method further includes: instructing the insurer node to record a continuous usage behavior of the user.

The personal security kernel node of the user may be insured. If the user uses the personal security kernel node that is installed with the identity authentication APP or the signature applet APP according to the embodiments of the present disclosure, but loses user identity assets due to a non-user reason, the user can claim for compensation from the insurance company. However, in the foregoing embodiments, if the user identity credential is degraded and the user is informed to replace the user identity credential, but the user continues to use the user identity credential, the insurance company is notified. In this case, once the leakage of the user identity assets occurs, it is caused by false trust of the user, and the insurance company does not accept the claim. This embodiment achieves the advantage of implementing integration and automation of the authentication chain and the insurance claim settlement.

Figure 7:
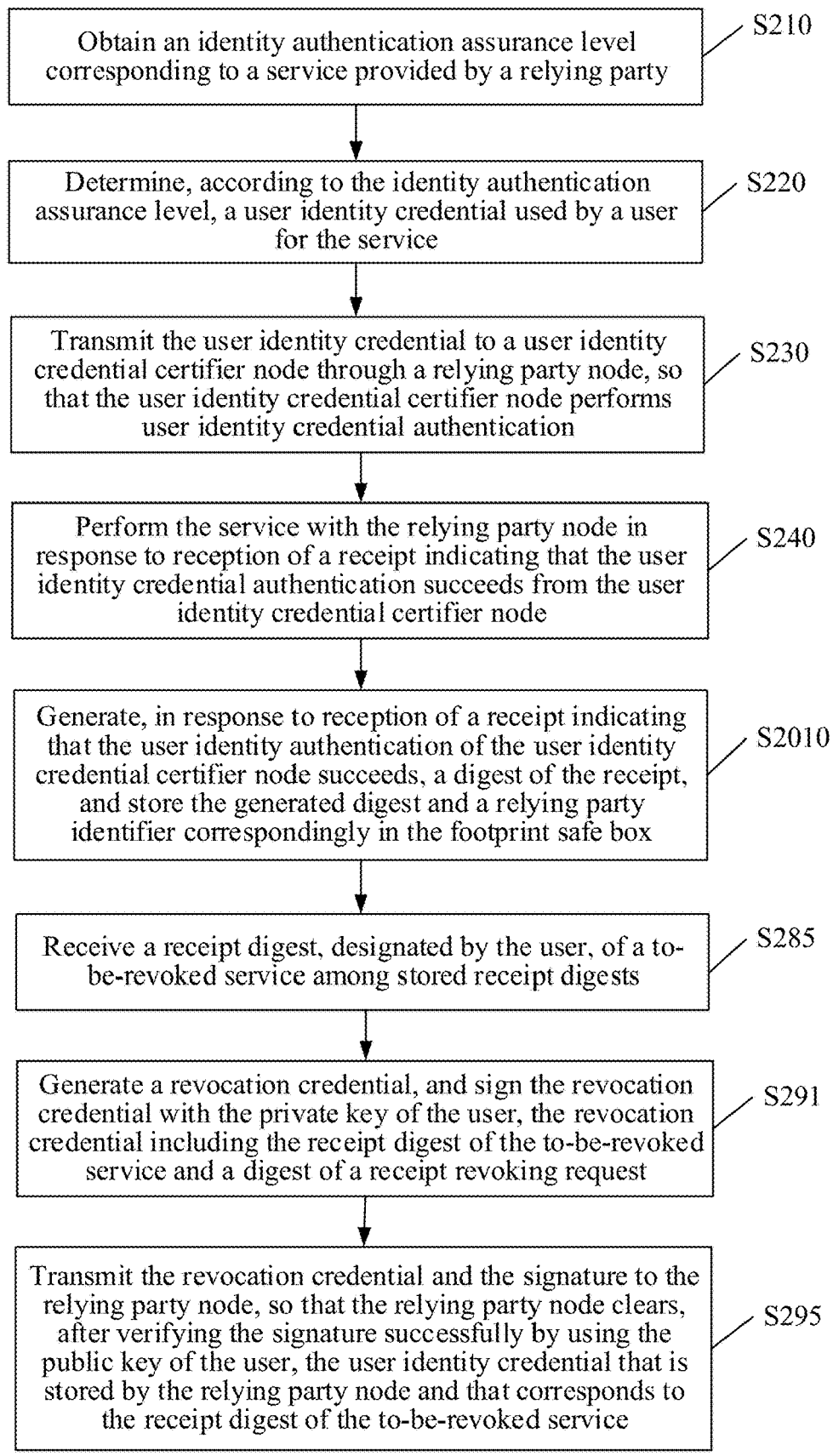
FIG. 7 is a flowchart of an identity authentication method according to an embodiment of the present disclosure.

As shown in FIG. 7, in an embodiment, after step 240, the method further includes step 2010: Generate, in response to reception of a receipt indicating that user identity authentication succeeds from the user identity credential certifier node, a digest of the receipt, and store the generated digest and a relying party identifier correspondingly in the footprint safe box.

As described above, the footprint safe box needs to store all user identity credentials of the user and digests of all receipts indicating that user identity authentication succeeds. These receipts become proofs, namely, "footprints", showing that the user has authenticated which user identity credential for which relying party. Once the service needs to be performed again with the same relying party later, reference may be directly made to the "footprints", to perform the service in the corresponding receipt, thereby greatly improving the efficiency of performing the service of the same relying party by the user subsequently.

Therefore, in this embodiment, before step 250, the method further includes:

obtaining a relying party identifier; and performing, with the relying party node in a case that the obtained relying party identifier is consistent with a relying party identifier stored in the footprint safe box, a service in a receipt corresponding to a digest corresponding to the relying party identifier.

The identifier of the relying party may be obtained in a code scanning step as shown in FIG. 2I. That is, the two-dimensional code shown in FIG. 2I includes the relying party qualification information, and further includes the relying party identifier. The identifier may be an industrial and commercial registration number, or may be an identifier that is specifically issued by a specific server for the relying party. After the identifier is obtained, because historical receipt digests and relying party identifiers are correspondingly stored in the footprint safe box, the receipt digest corresponding to the relying party identifier may be obtained, and the service in the corresponding receipt may be found.

In an embodiment, the receipt has a period of validity. The service demander performed a service with the relying party a long time ago, and has obtained a receipt generated by authenticating the user identity credential. However, within a long period of time, the credit status of the relying party may have changed, and the service demander may not have the same user identity assets as before. Therefore, if the receipt has not expired, the corresponding service may be directly performed according to the historical receipt; otherwise, the corresponding service cannot be performed, and the procedure of steps 210 to 270 in FIG. 3 still needs to be performed. This approach achieves the advantage of avoiding authenticating the user identity credential repeatedly if the service demander has performed the service with the relying party in a recent period of time, thereby improving the service performance efficiency, and also fully considering constant changes of the credit of the relying party and the credit of the service demander.

In this embodiment, the receipt has a period of validity. The performing, with the relying party node, a service in a receipt corresponding to a digest corresponding to the relying party identifier includes:

transmitting a receipt request to the relying party node, and signing the receipt request with the private key of the user, the receipt request including the digest corresponding to the relying party identifier, where after the relying party node verifies the signature by using the public key of the user successfully, the receipt corresponding to the digest is returned;

determining whether a current time point is within the period of validity of the receipt; and performing the service in the receipt with the relying party node if the current time point is within the period of validity of the receipt.

Due to limited storage space, only the digest of the receipt is stored by the personal security kernel node, and to perform the service, the relying party node first needs to find the receipt according to the digest. If the receipt is generated by the relying party node, the generated receipt and the digest are correspondingly stored in the relying party node. Therefore, the receipt request is transmitted to the relying party node, and the relying party node returns the receipt. To ensure that the receipt request is really transmitted by the personal security kernel node, the receipt request is signed with the private key of the user. The signature and the receipt request are transmitted together. After receiving the receipt, the relying party node verifies the signature by using the public key of the user. If the verification succeeds, it is proved that the request is really transmitted by the personal security kernel node. In this case, the receipt corresponding to the digest may be returned. In this case, it is determined whether the receipt has expired, that is, whether the current time point is within the period of validity of the receipt. If the current time point is within the period of validity of the receipt, a service performance link in the receipt may be entered, and the service is started to be performed on the service performance page.

In an embodiment, the user may further revoke reliance on the relying party at any time. If the user has trusted a specific relying party and has performed a service with the relying party before, but does not want to perform the service with the relying party again, the user may select to revoke the corresponding receipt digest stored in the footprint safe box. In this way, later, when the user trusts the same relying party to perform the service, the corresponding receipt digest cannot be found in the footprint safe. Therefore, the user cannot perform the service directly from the entry. This embodiment provides a convenient way of revoking the reliance on a specific relying party that has been trusted before.

As shown in FIG. 7, after step 2010, the method may further include the following steps:

Step 285. Receive a receipt digest, designated by the user, of a to-be-revoked service among stored receipt digests.

Step 291. Generate a revocation credential, and sign the revocation credential with the private key of the user, the revocation credential including the receipt digest of the to-be-revoked service and a digest of a receipt revoking request.

Step 295. Transmit the revocation credential and the signature to the relying party node, so that the relying party node clears, after verifying the signature successfully by using the public key of the user, the user identity credential that is stored by the relying party node and that corresponds to the receipt digest of the to-be-revoked service.

A list of stored receipt digests may be displayed, so that the user can select the receipt digest to be revoked on the interface. Then, the revocation credential is generated. The revocation credential may include two parts of content. One part of the content is the receipt digest of the to-be-revoked service, and the other part of the content is the digest of receipt revoking request. The receipt digest of the to-be-revoked service allows the relying party node to know clearly, after receiving the receipt digest, which receipt is to be revoked. The receipt revoking request express the intention of revoking the receipt. With the digest of receipt revoking request, the relying party node copies the digest, to form evidence of the user's will. After the revocation credential is generated, the revocation credential is signed with the private key of the user and is transmitted to the relying party node. The relying party node verifies the signature by using the public key of the user. This helps verify whether the revocation credential is really transmitted by the user. If not, the verification fails. If the verification succeeds, the relying party node clears the stored user identity credential corresponding to the receipt digest of the service to be revoked. In this way, when the user no longer trusts the relying party to perform the service, the relying party no longer stores the identity credential of the user, to prevent the identity assets from being leaked.

In a case that the personal security kernel node includes the personal security kernel client and the personal security kernel server, if the terminal installed with the identity authentication APP or the signature applet according to the embodiments of the present disclosure is lost, to enable the user to retrieve the assets in the footprint safe box, including the user identity credential of the user and the foregoing receipt, the personal security kernel server stores a user identity credential and a receipt digest that are the same as those stored in the personal security kernel client. The method is performed by the personal security kernel client, and includes:

transmitting a user identity credential and receipt recovery request as well as a signature that is made with the private key of the user to the personal security kernel server, so that the personal security kernel server receives the user identity credential and receipt recovery request as well as the signature, transmits the receipt digest to the relying party node after the signature is verified successfully by using the public key of the user, receives a receipt corresponding to the receipt digest from the relying party node, and returns the receipt and the user identity credential together to the personal security kernel client; and receiving the user identity credential and the receipt, and storing the user identity credential and the receipt in the footprint safe box.

In a case that the user's terminal installed with the identity authentication APP or the signature applet, only the user knows the private key thereof and can retrieve all identity assets by using the private key. The user may use another person's terminal to enter the identity authentication APP or the signature applet, to generate a user identity credential and receipt recovery request and signs with the private key of the user, and transmit the request and the signature to the personal security kernel server. To verify whether the request and the signature are generated and transmitted by the user, the personal security kernel server verifies the signature by using the public key of the user. If the signature is generated by using the private key of the user, the verification succeeds, and the user identity credential may be returned to the personal security kernel client. For the receipt, because the personal security kernel server only stores the digest, the request may be transmitted to the relying party node by virtue of the digest. The receipt corresponding to the receipt digest is received from the relying party node, and is returned to the personal security kernel client. In this way, in a case that the user's terminal installed with the identity authentication APP or the signature applet is lost, the user can still recover all the identity assets.

Figure 8:
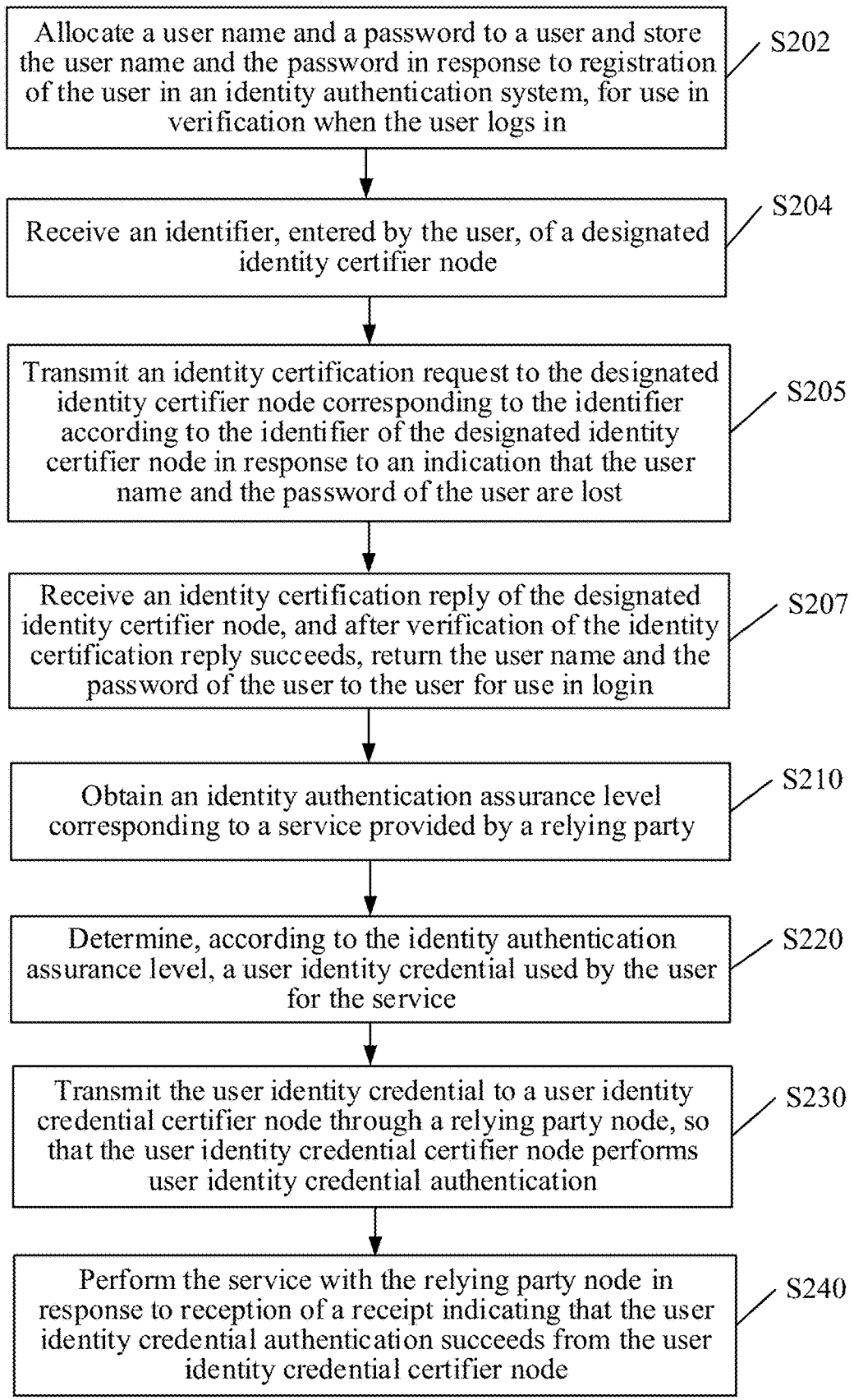
FIG. 8 is a flowchart of an identity authentication method according to an embodiment of the present disclosure.

In an embodiment, as shown in FIG. 8, before step 210, the method further includes the following steps:

Step 202. Allocate a user name and a password to the user and store the user name and the password in response to registration of the user in the identity authentication system, for use in verification when the user logs in.

Step 204. Receive an identifier, entered by the user, of a designated identity certifier node.

Step 205. Transmit an identity certification request to the designated identity certifier node corresponding to the identifier according to the identifier of the designated identity certifier node in response to an indication that the user name and the password of the user are lost.

Step 207. Receive an identity certification reply of the designated identity certifier node, and after verification of the identity certification reply succeeds, return the user name and the password of the user to the user for use in login.

Before the user logs in to the identity authentication APP or the signature applet according to the embodiments of the present disclosure, a registration procedure needs to be performed. During registration, the user enters information required for registration, and a user name and a password are allocated to the user. The user name and the password may be generated automatically by the personal security kernel client. Alternatively, the user may enter a user name and a password, and then the personal security kernel client checks whether the user name has been registered by another user. If the user name has not been registered, the user name and the password are allocated to the user and stored. Later, when the user needs to perform identity authentication before the service is performed, the user first enters the user name and the password. The user can log in only after the verification succeeds.

To allow the user to retrieve the user name or the password when forgetting the user name or the password, the user further enters the identifier of the specified identity certifier node. Once the user name and the password of the user are lost, the user selects an option "retrieve the user name or the password" on the interface, and transmits, according to the identifier of the specified identity certifier node entered by the user during original registration, the identity certification request to the specified identity certifier node corresponding to the identifier. The specified identity certifier node may be a mobile phone of a friend. There may be a plurality of specified identity certifier nodes. When identity certification replies are received from all or a predetermined quantity or more of the specified identity certifier nodes, and all the replies prove that the identity of the user is true, the user name and the password may be returned to the user.

This embodiment provides a quick way of retrieving the user name or the password when the user forgets the user name or the password.

In an embodiment, step 272 includes:

receiving a handwriting of a handwritten signature of the user after the service performance result is signed with the private key of the user; and transmitting the service performance result, the signature made with the private key of the user, and the handwriting together to the relying party node, so that the relying party node first transmits the handwriting to a handwriting appraiser node, and verifies the signature by using the public key of the user after it is checked that the handwriting is consistent with a user handwriting stored in the handwriting appraiser node.

After the user selects "sign" on the interface shown in FIG. 2L, the service performance result is signed with the private key of the user. As shown in FIG. 2M and FIG. 2N, the user is asked to handwrite a signature, this is because Chinese users are accustomed to handwriting signatures, and will feel insecure if signatures are not handwritten; secondly, with the handwritten signature, two-factor verification is implemented, to further prove that the service performance result is transmitted by the personal security kernel node of the user. After the service performance result, the signature made with the private key of the user, and the handwriting are transmitted together to the relying party node, the relying party node transmits the handwriting to the handwriting appraiser node for authentication. The handwriting appraiser node may be a server of a handwriting appraisal authority, and the server may pre-store handwritings of various users. After receiving the handwriting, the handwriting appraiser node compares the handwriting with the stored handwriting of the user. If the handwriting is consistent with the stored handwriting of the user, the verification succeeds, and the signature is verified by using the public key of the user. In this way, the handwriting verification and the previous verification form two-factor verification, to further confirm that the user is a real transmitter of the service performance result, thereby improving the authentication security.

Figure 9A:
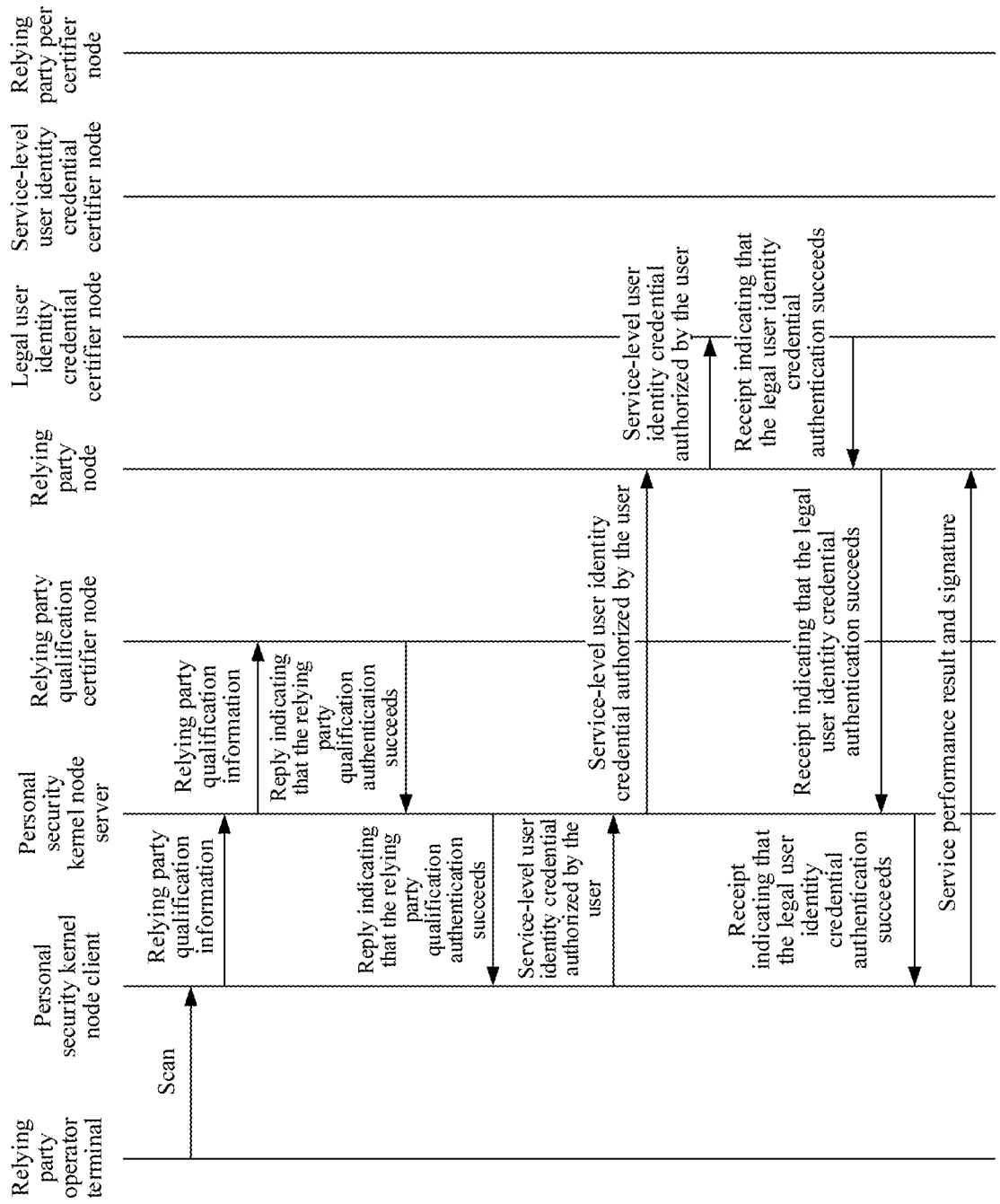
FIG. 9A to FIG. 9C are three interaction flowcharts of nodes in an identity authentication system during implementation of an identity authentication method according to an embodiment of the present disclosure.

FIG. 9A is an interaction flowchart of nodes in an identity authentication system when a user identity credential is a legal user identity credential.

When a service demander needs to perform a service with a relying party, for example, verification of an auditing report, liaison of the service demander uses a terminal (that is, a personal security kernel node client) to scan a two-dimensional code generated by the identity authentication APP or the signature applet according to the embodiments of the present disclosure on a terminal of liaison of the relying party, to obtain relying party qualification information included in the two-dimensional code. The personal security kernel node client transmits the relying party qualification information to a personal security kernel node server. The personal security kernel node server transmits the relying party qualification information to a relying party qualification certifier node, to authenticate the relying party qualification information, that is, whether the relying party is qualified to obtain a user identity credential of the service demander. If the authentication succeeds, the personal security kernel node server receives a reply indicating that the relying party qualification authentication succeeds from the relying party qualification certifier node, and transfers the reply to the personal security kernel node client.

The personal security kernel node client searches an internally stored correspondence table of services and identity authentication assurance levels for an identity authentication assurance level corresponding to a service provided by the relying party. Then, candidate user identity credentials that match the identity authentication assurance level and the service provided by the relying party are found from an internally stored correspondence table of identity authentication assurance levels, services, and candidate user identity credentials, and are displayed to the user. The user selects a user identity credential for authorization.

If the user identity credential authorized by the user is a legal user identity credential, the personal security kernel node client transmits the legal user identity credential to the personal security kernel node server. The personal security kernel node server transmits the legal user identity credential to the relying party node. After determining that the user identity credential is a legal user identity credential, the relying party node transmits the legal user identity credential to a legal user identity credential certifier node. If authentication by the legal user identity credential certifier node succeeds, a receipt indicating that the authentication of the legal user identity credential succeeds is generated, and the receipt is transmitted to the personal security kernel node server. The personal security kernel node server forwards the receipt to the personal security kernel node client. The personal security kernel node client enters a link in the receipt to start to perform the service, signs a service performance result with a private key of the user, and transmits the service performance result together with the signature to the relying party node, so that the relying party node verifies the signature by using a public key of the user.

Figure 9B:
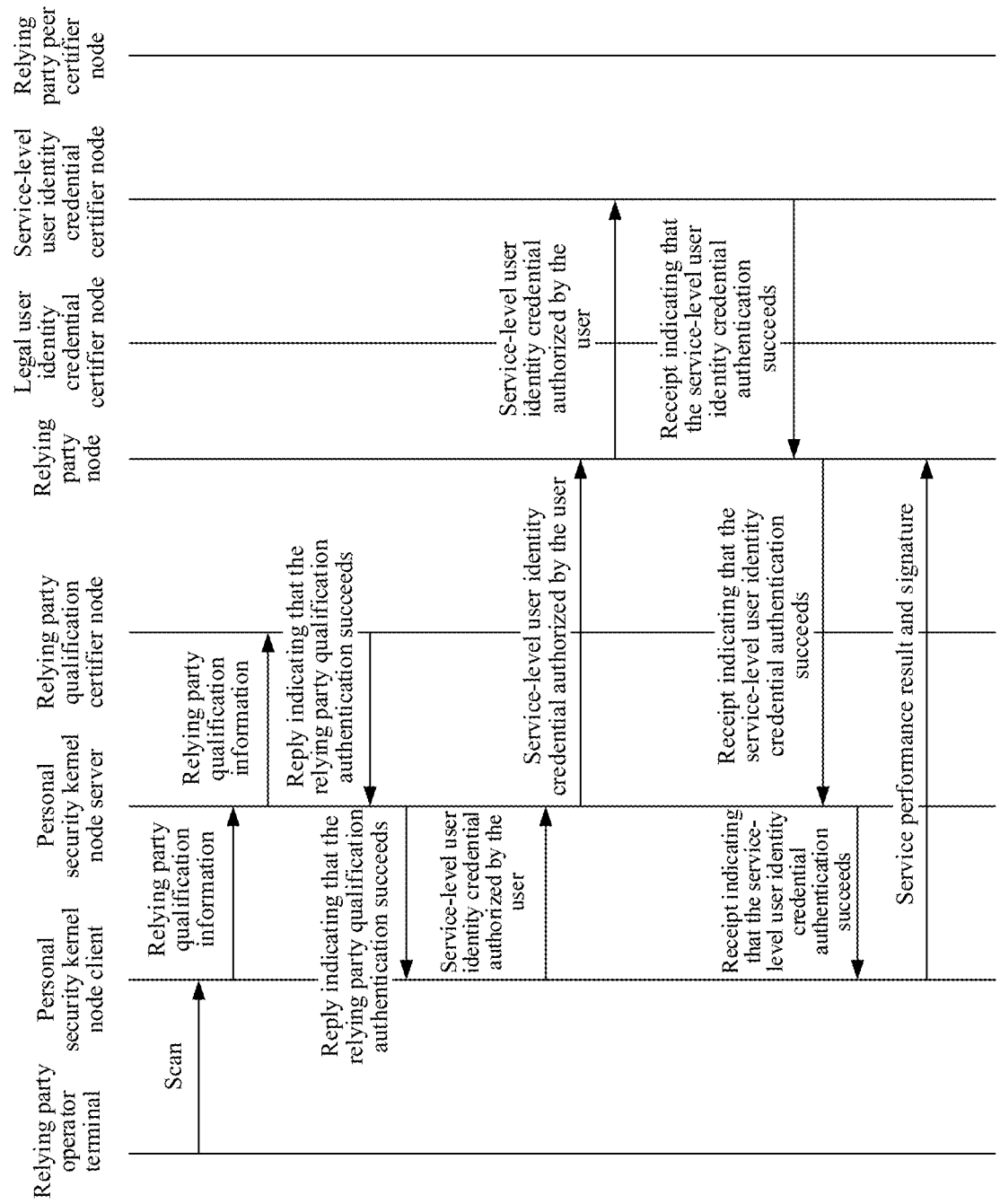

FIG. 9B is an interaction flowchart of nodes in an identity authentication system when a user identity credential authorized by a user is a service-level user identity credential. A difference between FIG. 9B and FIG. 9A is that, in FIG. 9B, the user authorizes a service-level user identity credential. The relying party node forwards the service-level user identity credential to a service-level user identity credential certifier node for authentication, and receives a receipt of an authentication result from the service-level user identity credential certifier node.

Figure 9C:
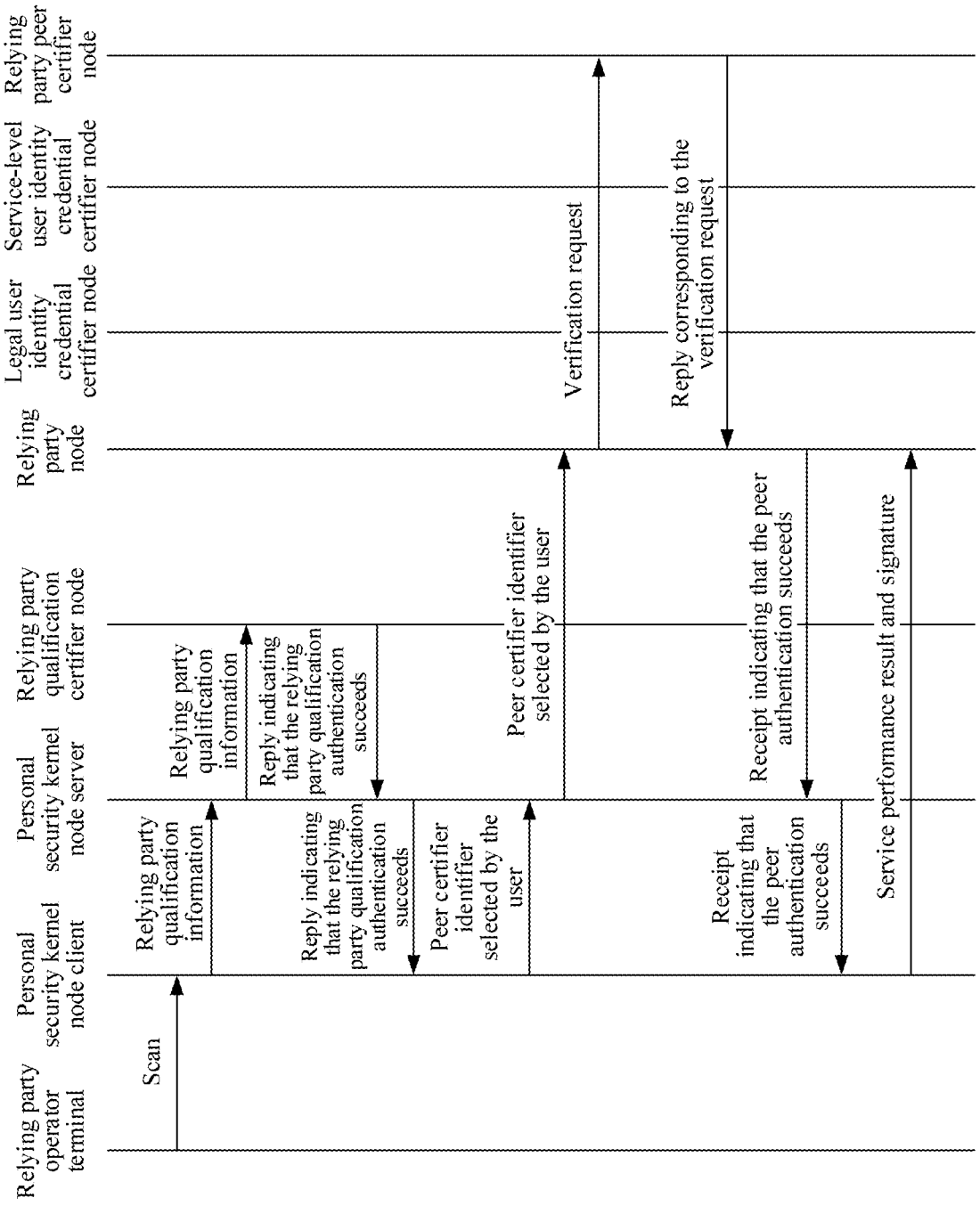

FIG. 9C is an interaction flowchart of nodes in an identity authentication system when a user authorizes a peer certifier. A difference between FIG. 9C and FIG. 9A is that, in FIG. 9, the user authorizes a peer certifier, and the user selects a peer certifier identifier. The personal security kernel node client transmits the peer certifier identifier selected by the user to the personal security kernel node server. The personal security kernel node server transmits the peer certifier identifier selected by the user to the relying party node. The relying party node transmits a verification request to the peer certifier corresponding to the identifier. The peer certifier transmits a reply corresponding to the verification request, where the identity of the user is proved in the reply. After the relying party node receives replies that prove the legal identity of the user from all peer certifiers or replies that prove the legal identity of the user transmitted from a predetermined quantity of peer certifiers, it is considered that the peer authentication succeeds, and a receipt indicating that the peer authentication succeeds is transmitted to the personal security kernel node server. The personal security kernel node server transmits the receipt indicating that the peer authentication succeeds to the personal security kernel node client.

Figure 10:
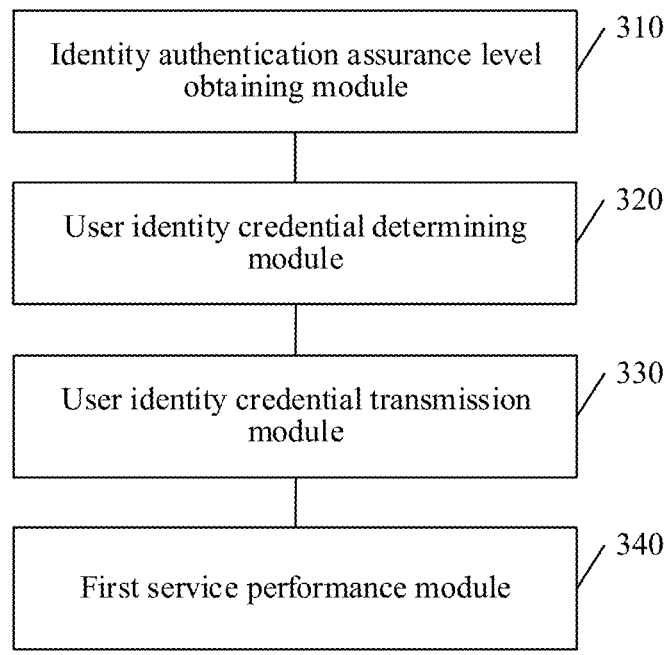
FIG. 10 is a module diagram of a personal security kernel node according to an embodiment of the present disclosure.

As shown in FIG. 10, according to an embodiment of the present disclosure, a personal security kernel node is provided. The personal security kernel node exists in an identity authentication system. The identity authentication system includes the personal security kernel node, and further includes a relying party node and a user identity credential certifier node. The personal security kernel node includes:

an identity authentication assurance level obtaining module 310, configured to obtain an identity authentication assurance level corresponding to a service provided by a relying party;

a user identity credential determining module 320, configured to determine, according to the identity authentication assurance level, a user identity credential used by a user for the service;

a user identity credential transmission module 330, configured to transmit the user identity credential to the user identity credential certifier node through the relying party node, so that the user identity credential certifier node performs user identity credential authentication; and a first service performance module 340, configured to perform the service with the relying party node in response to reception of a receipt indicating that the user identity credential authentication succeeds from the user identity credential certifier node.

In an embodiment, the identity authentication system further includes a relying party qualification certifier node, and the apparatus further includes:

a relying party qualification information obtaining module, configured to obtain relying party qualification information; and a relying party qualification information transmission module, configured to transmit the relying party qualification information to the relying party qualification certifier node, so that the relying party qualification certifier node performs relying party qualification authentication;

where the identity authentication assurance level obtaining module 310 is specifically configured to obtain, in a case that a reply indicating the relying party qualification authentication succeeds is received from the relying party qualification certifier node, the identity authentication assurance level corresponding to the service provided by the relying party.

In an embodiment, the user identity credential determining module 320 is specifically configured to: present candidate user identity credentials that match the identity authentication assurance level and the service provided by the relying party; and
receive a candidate user identity credential selected by the user, and determine the candidate user identity credential selected by the user as the user identity credential used by the user for the service.

In an embodiment, the user identity credential certifier node includes a service-level user identity credential certifier node and a legal user identity credential certifier node. The user identity credential determining module 320 is further configured to: transmit the user identity credential to the relying party node, where the relying party node transmits the user identity credential to the legal user identity credential certifier node in a case that the user identity credential is a legal identity credential; and the relying party node transmits the user identity credential to the service-level user identity credential certifier node in a case that the user identity credential is a service-level user identity credential.

In an embodiment, the identity authentication system further includes a peer certifier node. The personal security kernel node further includes:
a peer certifier identifier presentation module, configured to present peer certifier identifiers that match the identity authentication assurance level and the service provided by the relying party;
a peer certifier authorization module, configured to: receive a peer certifier identifier selected by the user, and use the selected peer certifier identifier as authorization of the user to a peer certifier corresponding to the peer certifier identifier;
a peer certifier identifier transmission module, configured to transmit the peer certifier identifier selected by the user to the relying party node, so that the relying party node transmits a verification request to the peer certifier corresponding to the peer certifier identifier; and
a second service performance module, configured to perform the service with the relying party node in a case that a receipt indicating successful peer authentication transmitted by the peer certifier through the relying party node is received.

In an embodiment, the personal security kernel node further includes:
a public-private key pair generation module, configured to: generate a pair of public and private keys of the user for the user in response to received user information, store the private key, and issue the public key; and
a service performance result signing module, configured to: sign a service performance result with the private key of the user, and transmit the service performance result and the signature together to the relying party node, so that the relying party node verifies the signature by using the public key of the user.

In an embodiment, the user information includes biological information of the user.

In an embodiment, the relying party qualification information transmission module is further configured to:
transmit the relying party qualification information together with a signature made on the relying party qualification information with the private key of the user to the relying party qualification certifier node, so that after the relying party qualification certifier node verifies the signature by using the public key of the user successfully, the relying party qualification certifier node performs relying party qualification authentication.

In an embodiment, the user identity credential transmission module 330 is further configured to:
transmit the user identity credential together with a signature made on the user identity credential with the private key of the user to the user identity credential certifier node through the relying party node, so that after successfully verifying the signature by using the public key of the user, the user identity credential certifier node performs user identity credential authentication.

In an embodiment, the relying party qualification certifier node includes a relying party identity authenticator node. The relying party qualification information includes a relying party identity certificate and an identifier of a relying party identity authenticator node that issues the relying party identity certificate. The relying party qualification information transmission module is further configured to: transmit the relying party identity certificate to the relying party identity authenticator node corresponding to the identifier of the relying party identity authenticator node, so that the relying party qualification certifier node performs relying party identity authentication.

In an embodiment, the relying party qualification certifier node includes a security credential authenticator node. The relying party qualification information includes a relying party security credential and an identifier of a security credential authenticator node that issues the relying party security credential. The relying party qualification information transmission module is further configured to: transmit the relying party security credential to the security credential authenticator node corresponding to the identifier of the security credential authenticator node, so that the relying party qualification certifier node performs relying party security credential authentication.

In an embodiment, the relying party qualification certifier node includes a security accident appraiser node, the security accident appraiser node storing security records of historical security accidents of all relying parties. The relying party qualification information includes a security record of the relying party. The relying party qualification information transmission module is further configured to: transmit the security record to the security accident appraiser node, so that the security accident appraiser node compares the received security record with the stored security record of the security accident of the relying party, to obtain an authentication result of the security record.

In an embodiment, the personal security kernel node further includes:
a relying party security credential level degradation notification module, configured to transmit, in a case that the security record of the relying party does not match a security credential level of the relying party according to a security credential level and security record matching rule, a notification of degrading the security credential level of the relying party to the security credential authenticator node.

In an embodiment, the personal security kernel node includes a correspondence table of identity authentication assurance levels, services and user identity credentials. The personal security kernel node further includes:
- a relying party security credential level degradation prompt module, configured to: present, in a case that the security record of the relying party does not match the security credential level of the relying party according to a security credential level and security record matching rule, a prompt of degrading the security credential level of the relying party, and query the user whether to continue to trust the relying party; and
- an identity authentication assurance level degradation module, configured to: in a case that a reply of continuing to trust the relying party is received from the user, degrade, in the correspondence table, the identity authentication assurance level corresponding to the user identity credential authorized by the user, after the user identity credential is transmitted to the user identity credential certifier node through the relying party node to perform user identity credential authentication.

In an embodiment, the identity authentication assurance level obtaining module is further configured to:
- obtain the identity authentication assurance level corresponding to the service provided by the relying party from a scanned two-dimensional code of the relying party.

In an embodiment, the relying party qualification information includes the service of the relying party. The identity authentication assurance level obtaining module is further configured to: search a correspondence table of services and identity authentication assurance levels, to determine the identity authentication assurance level corresponding to the service provided by the relying party.

In an embodiment, the user identity credential determining module 320 is further configured to:
- search the correspondence table of identity authentication assurance levels, services, and user identity credentials, to determine user identity credentials that match the identity authentication assurance level and the service provided by the relying party, and present the determined user identity credentials as candidate user identity credentials; and receive a candidate user identity credential selected by the user, and determine the candidate user identity credential selected by the user as the user identity credential used by the user for the service.

In an embodiment, the authorization module is further configured to:
- determine a digest of the user identity credential selected by the user;
- determine whether the digest exists in an identity leakage verification blockchain, where in a case that the relying party has a security accident, the security accident and a digest of a user identity credential leaked in the security accident are recorded in the identity leakage verification blockchain;
- display a user identity credential replacement prompt in response to determining that the digest exists in the identity leakage verification blockchain; and
- use a user identity credential after replacement by the user as the user identity credential used by the user for the service.

The personal security kernel node further includes: a user identity credential degradation module, configured to: in a case that the user selects not to replace the user identity credential, after the service is performed with the relying party node, degrade, in the correspondence table of identity authentication assurance levels, services, and user identity credentials, the identity authentication assurance level corresponding to the user identity credential used by the user for the service.

In an embodiment, the identity authentication system further includes an insurer node. The personal security kernel node further includes: a continuous usage behavior notification module, configured to instruct, in a case that the user selects not to replace the user identity credential, the insurer node to record a continuous usage behavior of the user, after the service is performed with the relying party node.

In an embodiment, the personal security kernel node includes: a footprint safe box, configured to store a digest of a receipt returned by the user identity credential certifier node.

The personal security kernel node further includes:
- a receipt digest generation module, configured to generate, in response to reception of a receipt indicating that user identity authentication succeeds from the user identity credential certifier node, a digest of the receipt, and store the generated digest and a relying party identifier correspondingly in the footprint safe box; and
- a relying party identifier obtaining module, configured to obtain a relying party identifier; and
- a third service performance module, configured to perform, with the relying party node in a case that the obtained relying party identifier is consistent with a relying party identifier stored in the footprint safe box, a service in a receipt corresponding to a digest corresponding to the relying party identifier.

In an embodiment, the receipt has a period of validity. The performing a service in a receipt corresponding to a digest corresponding to the relying party identifier with the relying party node includes:
- transmitting a receipt request to the relying party node, and signing the receipt request with the private key of the user, the receipt request including the digest corresponding to the relying party identifier, where after the relying party node verifies the signature by using the public key of the user successfully, the receipt corresponding to the digest is returned;
- determining whether a current time point is within the period of validity of the receipt; and
- performing the service in the receipt with the relying party node if the current time point is within the period of validity of the receipt.

In an embodiment, the personal security kernel node further includes:
- a designation receiving module, configured to receive a receipt digest, designated by the user, of a to-be-revoked service among stored receipt digests;
- a revocation credential and signature generation module, configured to generate a revocation credential, and sign the revocation credential with the private key of the user, the revocation credential including the receipt digest of the to-be-revoked service and a digest of a receipt revoking request; and
- a revocation credential and signature transmission module, configured to transmit the revocation credential and the signature to the relying party node, so that the relying party node clears, after verifying the signature successfully by using the public key of the user, the user identity credential that is stored by the relying party node and that corresponds to the receipt digest of the to-be-revoked service.

In an embodiment, the personal security kernel node further includes:

a user name and password allocation module, configured to allocate a user name and a password to the user and store the user name and the password in response to registration of the user in the identity authentication system, for use in verification when the user logs in;

an identifier receiving module, configured to receive an identifier, entered by the user, of a designated identity certifier node;

an identity certification request transmission module, configured to transmit an identity certification request to the designated identity certifier node corresponding to the identifier according to the identifier of the designated identity certifier node in response to an indication that the user name and the password of the user are lost; and a user name and password found module, configured to receive an identity certification reply of the designated identity certifier node, and after verification of the identity certification reply succeeds, return the user name and the password of the user to the user for use in login.

Figure 11:
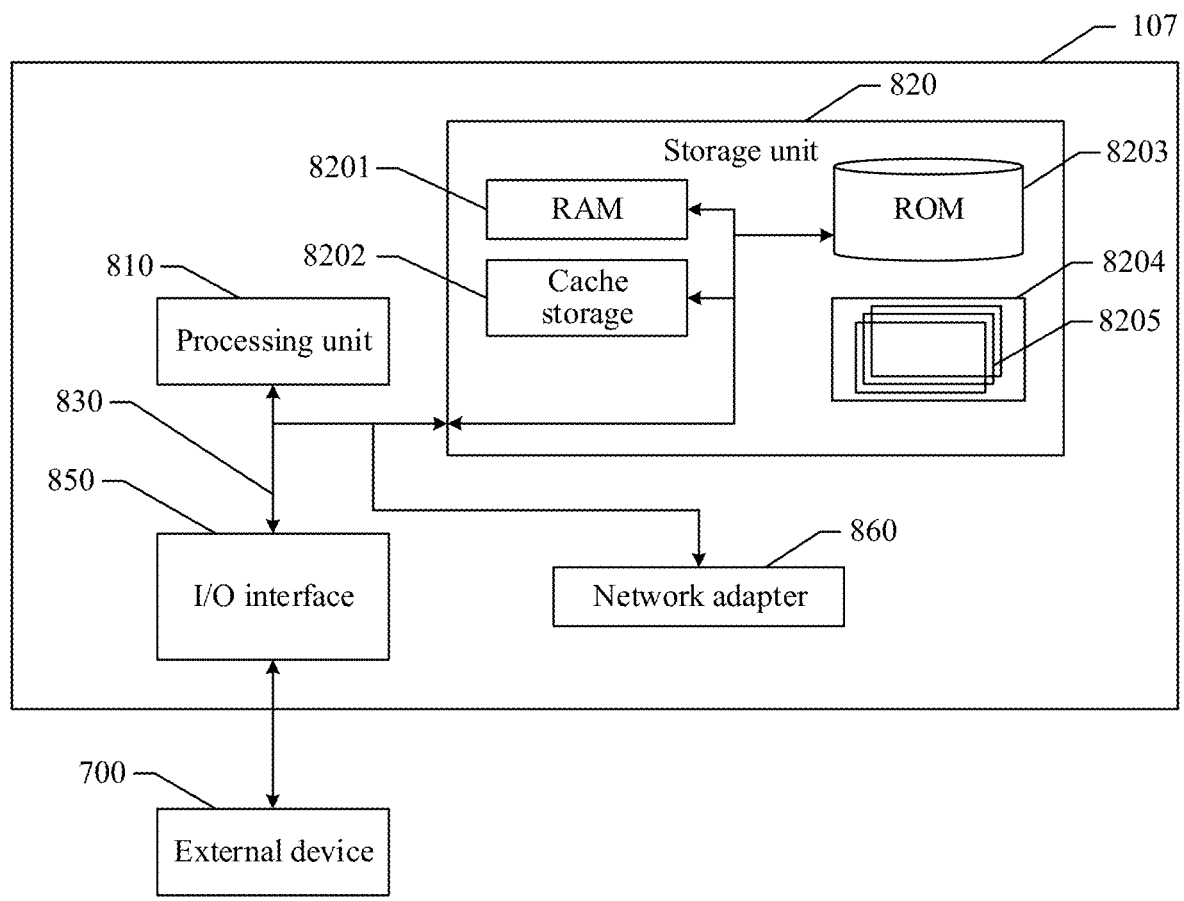
FIG. 11 is a hardware diagram of a personal security kernel node according to an embodiment of the present disclosure.

The identity authentication method according to the embodiments of the present disclosure may be implemented by using the personal security kernel node 107 in FIG. 11.

As shown in FIG. 11, the personal security kernel node 107 is represented in a form of a general-purpose computing device. Components of the personal security kernel node 107 may include, but are not limited to: the at least one processing unit 810, the at least one storage unit 820, and the bus 830 connected to different system components (including the storage unit 820 and the processing unit 810).

The storage unit stores program code. The program code, when executed by the processing unit 810, may cause the processing unit 810 to perform the steps according to the exemplary implementations of this application described in the exemplary methods in this specification. For example, the processing unit 810 may perform each step shown in FIG. 3.

The storage unit 820 may include a readable medium in the form of a volatile storage unit, for example, a random access memory (RAM) 8201 and/or a cache storage unit 8202, and may further include a read-only storage unit (ROM) 8203.

The storage unit 820 may further include a program/utility 8204 having a group of (at least one) program modules 8205. Such a program module 8205 includes, but is not limited to, an operating system, one or more application programs, other program modules, and program data. Each or a combination of these examples may include implementation of a network environment.

The bus 830 may represent one or more of several types of bus structures, including a storage unit bus or a storage unit controller, a peripheral bus, an accelerated graphics port, a processing unit, or a local bus using any bus structure in a plurality of types of bus structures.

The personal security kernel node 107 may alternatively communicate with one or more external devices 700 (for example, a keyboard, a pointing device, and a Bluetooth device), may alternatively communicate with one or more devices that can enable a user to interact with the personal security kernel node 107, and/or may communicate with any device (for example, a router and a modem) that enables the personal security kernel node 107 to communicate with one or more other computing devices. Such communication may be performed by using an input/output (I/O) interface 650. In addition, the personal security kernel node 107 may further communicate with one or more networks such as a local area network (LAN), a wide area network (WAN), and/or a public network (such as the Internet) through a network adapter 860. As shown in the figure, the network adapter 860 communicates with other modules of the personal security kernel node 107 by using the bus 830. It is to be understood that although not shown in the figure, other hardware and/or software modules may be used in combination with the personal security kernel node 107, including, but not limited to microcode, a device drive, a redundancy processing unit, an external disk drive array, a RAID system, a tape drive, a data backup and storage system, and the like.

In an embodiment, a computer program product is disclosed, including instructions, the instructions, when being run on a computer, causing the computer to perform any method described above.

In an embodiment, a computer program medium is disclosed, storing computer-readable instructions, the computer-readable instructions, when executed by a processor of a computer, causing the computer to perform any method described above.

Through descriptions of the foregoing implementations, a person skilled in the art can easily understand that the exemplary implementations described herein may be implemented by software or by combining software with necessary hardware. Therefore, the technical solutions of the implementations of the present disclosure may be implemented in the form of a software product. The software product may be stored in a non-volatile storage medium (which may be a CD-ROM, a USB flash drive, a removable hard disk, or the like) or in a network and includes several instructions for instructing a computer device (which may be a personal computer, a server, a terminal device, a network device, or the like) to perform the methods described in the implementations of the present disclosure.

In the examples of the embodiments of the present disclosure, a computer program medium is further provided, storing computer-readable instructions, the computer-readable instructions, when executed by a processor of a computer, causing the computer to perform some described methods according to the method embodiments.

According to an embodiment of the present disclosure, a program product for implementing the methods in the foregoing method embodiments is further provided. The program product may use a portable compact disc read-only memory (CD-ROM) and include program code, and may be run on a terminal device such as a personal computer. However, the program product of this application is not limited to this. In this specification, the readable storage medium may be any tangible medium including or storing a program, and the program may be used by or in combination with an instruction execution system, apparatus, or device.

The program product may use any combination of one or more readable media. The readable medium may be a readable signal medium or a readable storage medium. The readable storage medium may be, for example, but not limited to, an electric, magnetic, optical, electromagnetic, infrared, or semi-conductive system, apparatus, or device, or any combination thereof. More specific examples (non-exhaustive list) of the readable storage media may include: an electrical connection having one or more wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination thereof.

The computer-readable signal medium may include a data signal transmitted in a baseband or as part of a carrier, and stores readable program code. The propagated data signal may be in a plurality of forms, including, but not limited to, an electromagnetic signal, an optical signal, or any appropriate combination thereof. The readable signal medium may alternatively be any readable medium other than the readable storage medium. The readable medium may be configured to transmit, propagate, or transmit a program configured to be used by or in combination with an instruction execution system, apparatus, or device.

The program code included in the readable medium may be transmitted by using any suitable medium, including but not limited to, via wireless transmission, a wire, a cable, radio frequency (RF) or the like, or any suitable combination of thereof.

The program code used for executing the operations of this application may be written by using one or more programming languages or a combination thereof. The programming languages include an object-oriented programming language such as Java, C++ and the like, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. For the case involving a remote computing device, the remote computing device may be connected to a user computing device through any type of network including a local area network (LAN) or a wide area network (WAN), or may be connected to an external computing device (for example, through the Internet by using an Internet service provider).

Although several modules or units of a device for action execution are mentioned in the foregoing detailed descriptions, the division is not mandatory. Actually, according to the implementations of the present disclosure, features and functions of the two or more modules or units described above may be embodied in one module or unit. Conversely, the features and functions of one module or unit described above may be further divided into a plurality of modules or units to be embodied.

In addition, although the steps of the method in the present disclosure are described in the accompanying drawings in a specific sequence, this does not require or imply that these steps need to be performed according to the specific sequence, or all shown steps need to be performed to achieve an expected result. Additionally or alternatively, some steps may be omitted, a plurality of steps are combined into one step, and/or one step is decomposed into a plurality of steps for execution, and the like.

Through the description of the foregoing embodiments, a person of ordinary skill in the art can easily understand that the exemplary implementations described herein may be implemented by software, or may be implemented by combining software with necessary hardware. Therefore, the technical solutions of the implementations of the present disclosure may be implemented in the form of a software product. The software product may be stored in a non-volatile storage medium (which may be a CD-ROM, a USB flash drive, a removable hard disk, or the like) and includes several instructions for instructing a computer device (which may be a personal computer, a server, a mobile terminal, a network device, or the like) to execute the methods described in the implementations of the present disclosure.

After considering the specification and practicing the present disclosure, a person skilled in the technology would easily conceive of other implementations of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the related art. The specification and the embodiments are merely for an illustration purpose, and the true scope and spirit of the present disclosure are subject to the claims.

What is claimed is:

1. An identity authentication method, performed by a computer device acting as a personal security kernel node of an identity authentication system, the identity authentication system further comprising a relying party node, a peer certifier node and a user identity credential certifier node, the method comprising:
    obtaining, from a correspondence table of identity authentication assurance levels, services and user identity credentials, an identity authentication assurance level corresponding to a service provided by a relying party and requested by a user;
    determining, according to the identity authentication assurance level, a user identity credential associated with the service requested by the user, further including:
        identifying, in the correspondence table, multiple candidate user identity credentials that match the identity authentication assurance level and the service;
        presenting the multiple candidate user identity credentials and multiple peer certifier identifiers that match the identity authentication assurance level and the service provided by the relying party node to the user;
        receiving, from the multiple candidate user identity credentials, a candidate user identity credential selected by the user and, from the multiple peer certifier identifiers, a peer certifier identifier selected by the user, respectively; and
        determining the user-selected candidate user identity credential as the user identity credential associated with the service and the user-selected peer certifier identifier as authorization of the user to the peer certifier node;
    transmitting the user identity credential to the user identity credential certifier node through the relying party node and the user-selected peer certifier identifier to the relying party node, wherein the user identity credential certifier node performs user identity credential authentication for the service using the user-selected candidate user identity credential and the relying party node transmits a verification request to the peer certifier node corresponding to the peer certifier identifier; and
    performing the service with the relying party node to the user in response to reception of a receipt indicating that the user identity credential authentication succeeds from the user identity credential certifier node and a receipt indicating that successful peer authentication transmitted by the peer certifier node through the relying party node.

2. The method according to claim 1, wherein the identity authentication system further comprises a relying party qualification certifier node, and the method further comprises:

obtaining relying party qualification information; and transmitting the relying party qualification information to the relying party qualification certifier node, wherein the relying party qualification certifier node performs relying party qualification authentication; and the obtaining an identity authentication assurance level corresponding to a service provided by a relying party comprises:

obtaining, in response to receiving a reply indicating that the relying party qualification authentication succeeds from the relying party qualification certifier node, the identity authentication assurance level corresponding to the service provided by the relying party.

3. The method according to claim 2, wherein the personal security kernel node comprises a personal security kernel client and a personal security kernel server, the identity authentication method is performed by the personal security kernel client in the personal security kernel node, and the transmitting the relying party qualification information to the relying party qualification certifier node comprises:

transmitting the relying party qualification information to the relying party qualification certifier node through the personal security kernel server;

the receiving a reply indicating that the relying party qualification authentication succeeds from the relying party qualification certifier node comprises: receiving, through the personal security kernel server, the reply indicating that the relying party qualification authentication succeeds from the relying party qualification certifier node;

the transmitting the user identity credential to the user identity credential certifier node through the relying party node comprises: transmitting the user identity credential to the user identity credential certifier node through the personal security kernel server and the relying party node; and the receiving a receipt indicating that the user identity credential authentication succeeds from the user identity credential certifier node comprises: receiving, through the personal security kernel server, the receipt indicating that the user identity credential authentication succeeds from the user identity credential certifier node.

4. The method according to claim 2, wherein before the obtaining relying party qualification information, the method further comprises:

generating a pair of public and private keys of the user for the user in response to received user information, storing the private key, and issuing the public key; and after the performing the service with the relying party node, the method further comprises:

signing a service performance result with the private key of the user, and transmitting the service performance result and a signature together to the relying party node, so that the relying party node verifies the signature by using the public key of the user.

5. The method according to claim 2, wherein the relying party qualification certifier node comprises a relying party identity authenticator node;

the relying party qualification information comprises a relying party identity certificate and an identifier of the relying party identity authenticator node that issues the relying party identity certificate; and the transmitting the relying party qualification information to the relying party qualification certifier node, so that the relying party qualification certifier node performs relying party qualification authentication comprises: transmitting the relying party identity certificate to the relying party identity authenticator node corresponding to the identifier of the relying party identity authenticator node, so that the relying party qualification certifier node performs relying party identity authentication.

6. The method according to claim 2, wherein the relying party qualification certifier node comprises a security credential authenticator node;

the relying party qualification information comprises a relying party security credential and an identifier of the security credential authenticator node that issues the relying party security credential; and the transmitting the relying party qualification information to the relying party qualification certifier node, so that the relying party qualification certifier node performs relying party qualification authentication comprises: transmitting the relying party security credential to the security credential authenticator node corresponding to the identifier of the security credential authenticator node, so that the relying party qualification certifier node performs relying party security credential authentication.

7. The method according to claim 6, wherein the relying party qualification certifier node comprises a security accident appraiser node, the security accident appraiser node storing security records of historical security accidents of all relying parties;

the relying party qualification information comprises a security record of the relying party; and the transmitting the relying party qualification information to the relying party qualification certifier node, so that the relying party qualification certifier node performs relying party qualification authentication comprises: transmitting the security record to the security accident appraiser node, so that the security accident appraiser node compares the received security record with the stored security record of the security accident of the relying party, to obtain an authentication result of the security record.

8. The method according to claim 6, wherein after the transmitting the relying party qualification information to the relying party qualification certifier node, to perform relying party qualification authentication, the method further comprises:

presenting, in response to determining that the security record of the relying party does not match a security credential level of the relying party according to a security credential level and security record matching rule, a prompt of degrading the security credential level of the relying party, and querying whether to continue to trust the relying party;

in a case that a reply of continuing to trust the relying party is received, after the transmitting the user identity credential to the user identity credential certifier node through the relying party node, to perform user identity credential authentication, the method further comprises: degrading the identity authentication assurance level corresponding to the user identity credential in the correspondence table.

9. The method according to claim 8, wherein the determining, according to the identity authentication assurance level, a user identity credential used by a user for the service comprises:
  searching the correspondence table of identity authentication assurance levels, services, and user identity credentials, to determine user identity credentials that match the identity authentication assurance level and the service provided by the relying party, and presenting the determined user identity credentials as candidate user identity credentials; and
  receiving a candidate user identity credential selected by the user, and determining the candidate user identity credential selected by the user as the user identity credential used by the user for the service.

10. The method according to claim 8, wherein the receiving a candidate user identity credential selected by the user, and determining the candidate user identity credential selected by the user as the user identity credential used by the user for the service comprises:
  determining a digest of the user identity credential selected by the user;
  determining whether the digest exists in an identity leakage verification blockchain, in a case that the relying party has a security accident, the security accident and a digest of a user identity credential leaked in the security accident being recorded in the identity leakage verification blockchain;
  displaying a user identity credential replacement prompt in response to determining that the digest exists in the identity leakage verification blockchain;
  using a user identity credential after replacement by the user as the user identity credential used by the user for the service; and
  in a case that the user selects not to replace the user identity credential, after the performing the service with the relying party node, the method further comprises: degrading, in the correspondence table of identity authentication assurance levels, services, and user identity credentials, the identity authentication assurance level corresponding to the user identity credential used by the user for the service.

11. The method according to claim 4, wherein the personal security kernel node comprises: a footprint safe box, configured to store a digest of the receipt returned by the user identity credential certifier node; and
  the method further comprises:
  generating, in response to reception of the receipt indicating that user identity authentication succeeds from the user identity credential certifier node, the digest of the receipt, and storing the generated digest and a relying party identifier correspondingly in the footprint safe box; and
  before the obtaining relying party qualification information, the method further comprises:
  obtaining a relying party identifier; and
  performing, with the relying party node in a case that the obtained relying party identifier is consistent with the relying party identifier stored in the footprint safe box, a service in a receipt corresponding to a digest corresponding to the relying party identifier.

12. The method according to claim 1, wherein the user identity credential certifier node comprises a service-level user identity credential certifier node and a legal user identity credential certifier node, and
  the transmitting the user identity credential to the user identity credential certifier node through the relying party node comprises: transmitting the user identity credential to the relying party node, and transmitting the user identity credential to the legal user identity credential certifier node by the relying party node in a case that the user identity credential is a legal identity credential; and transmitting the user identity credential to the service-level user identity credential certifier node by the relying party node in a case that the user identity credential is a service-level user identity credential.

13. A computer device acting as a personal security kernel node of an identity authentication system to perform an identity authentication method, the identity authentication system further comprising a relying party node and a user identity credential certifier node, the computer device comprising:
  a memory, storing computer-readable instructions; and
  a processor, configured to execute the computer-readable instructions stored in the memory, to perform a plurality of operations including:
  obtaining, from a correspondence table of identity authentication assurance levels, services and user identity credentials, an identity authentication assurance level corresponding to a service provided by a relying party and requested by a user;
  determining, according to the identity authentication assurance level, a user identity credential associated with the service requested by the user, further including:
    identifying, in the correspondence table, multiple candidate user identity credentials that match the identity authentication assurance level and the service;
    presenting the multiple candidate user identity credentials and multiple peer certifier identifiers that match the identity authentication assurance level and the service provided by the relying party node to the user;
    receiving, from the multiple candidate user identity credentials, a candidate user identity credential selected by the user and, from the multiple peer certifier identifiers, a peer certifier identifier selected by the user, respectively; and
    determining the user-selected candidate user identity credential as the user identity credential associated with the service and the user-selected peer certifier identifier as authorization of the user to the peer certifier node;
  transmitting the user identity credential to the user identity credential certifier node through the relying party node and the user-selected peer certifier identifier to the relying party node, wherein the user identity credential certifier node performs user identity credential authentication for the service using the user-selected candidate user identity credential and the relying party node transmits a verification request to the peer certifier node corresponding to the peer certifier identifier; and
  performing the service with the relying party node to the user in response to reception of a receipt indicating that the user identity credential authentication succeeds from the user identity credential certifier node and a receipt indicating that successful peer authentication transmitted by the peer certifier node through the relying party node.

14. The computer device according to claim 13, wherein the identity authentication system further comprises a relying party qualification certifier node, and the plurality of operations further comprise:

obtaining relying party qualification information; and transmitting the relying party qualification information to the relying party qualification certifier node, wherein the relying party qualification certifier node performs relying party qualification authentication; and the obtaining an identity authentication assurance level corresponding to a service provided by a relying party comprises:

obtaining, in response to receiving a reply indicating that the relying party qualification authentication succeeds from the relying party qualification certifier node, the identity authentication assurance level corresponding to the service provided by the relying party.

15. The computer device according to claim 13, wherein the user identity credential certifier node comprises a service-level user identity credential certifier node and a legal user identity credential certifier node, and the transmitting the user identity credential to the user identity credential certifier node through the relying party node comprises: transmitting the user identity credential to the relying party node, and transmitting the user identity credential to the legal user identity credential certifier node by the relying party node in a case that the user identity credential is a legal identity credential; and transmitting the user identity credential to the service-level user identity credential certifier node by the relying party node in a case that the user identity credential is a service-level user identity credential.

16. A non-transitory computer readable medium, storing computer-readable instructions, the computer-readable instructions, when executed by a processor of a computer device acting as a personal security kernel node of an identity authentication system that further comprises a relying party node and a user identity credential certifier node, causing the computer device to perform a plurality of operations including:

obtaining, from a correspondence table of identity authentication assurance levels, services and user identity credentials, an identity authentication assurance level corresponding to a service provided by a relying party and requested by a user;

determining, according to the identity authentication assurance level, a user identity credential associated with the service requested by the user, further including:

identifying, in the correspondence table, multiple candidate user identity credentials that match the identity authentication assurance level and the service;

presenting the multiple candidate user identity credentials and multiple peer certifier identifiers that match the identity authentication assurance level and the service provided by the relying party node to the user;

receiving, from the multiple candidate user identity credentials, a candidate user identity credential selected by the user and, from the multiple peer certifier identifiers, a peer certifier identifier selected by the user, respectively; and determining the user-selected candidate user identity credential as the user identity credential associated with the service and the user-selected peer certifier identifier as authorization of the user to the peer certifier node;

transmitting the user identity credential to the user identity credential certifier node through the relying party node and the user-selected peer certifier identifier to the relying party node, wherein the user identity credential certifier node performs user identity credential authentication for the service using the user-selected candidate user identity credential and the relying party node transmits a verification request to the peer certifier node corresponding to the peer certifier identifier; and performing the service with the relying party node to the user in response to reception of a receipt indicating that the user identity credential authentication succeeds from the user identity credential certifier node and a receipt indicating that successful peer authentication transmitted by the peer certifier node through the relying party node.

17. The non-transitory computer readable medium according to claim 16, wherein the identity authentication system further comprises a relying party qualification certifier node, and the plurality of operations further comprise:

obtaining relying party qualification information; and transmitting the relying party qualification information to the relying party qualification certifier node, wherein the relying party qualification certifier node performs relying party qualification authentication; and the obtaining an identity authentication assurance level corresponding to a service provided by a relying party comprises:

obtaining, in response to receiving a reply indicating that the relying party qualification authentication succeeds from the relying party qualification certifier node, the identity authentication assurance level corresponding to the service provided by the relying party.

* * * * *